US012664965B2

(12) United States Patent (10) Patent No.: US 12,664,965 B2
Inoue et al. (45) Date of Patent: Jun. 23, 2026

(54) SOUND-INSULATING SHEET MEMBER AND SOUND-INSULATING STRUCTURE PROVIDED WITH SAME

(71) Applicant: Mitsubishi Chemical Corporation, Tokyo (JP)

(72) Inventors: Kazuma Inoue, Tokyo (JP); Takahiro Komamura, Tokyo (JP); Yuya Saito, Tokyo (JP); Takeshi Matsuoka, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 253 days.

(21) Appl. No.: 18/373,784

(22) Filed: Sep. 27, 2023

(65) Prior Publication Data

US 2024/0029699 A1 Jan. 25, 2024

Related U.S. Application Data

(63) Continuation of application No. PCT/JP2022/016573, filed on Mar. 31, 2022.

(30) Foreign Application Priority Data

Mar. 31, 2021 (JP) ................................. 2021-061252

(51) Int. Cl.
*G10K 11/172* (2006.01)
*B32B 3/30* (2006.01)
(Continued)

(52) U.S. Cl.
CPC .............. *G10K 11/172* (2013.01); *B32B 3/30* (2013.01); *B32B 25/04* (2013.01); *G10K 11/162* (2013.01); *B32B 2307/102* (2013.01)

(58) Field of Classification Search
CPC .... G10K 11/172; G10K 11/162; B32B 25/04; B32B 2307/102; B32B 3/30
See application file for complete search history.

(56) References Cited

U.S. PATENT DOCUMENTS

2018/0340328 A1* 11/2018 Koga ...................... B32B 25/14
2019/0080679 A1* 3/2019 Alstad .................... B33Y 80/00
(Continued)

FOREIGN PATENT DOCUMENTS

JP 2000-265593 A 9/2000
JP 2000-330571 A 11/2000
(Continued)

OTHER PUBLICATIONS

Office Action issued in corresponding Japanese Patent Application No. 2022-564398 dated Jan. 17, 2023.
(Continued)

*Primary Examiner* — Forrest M Phillips
(74) *Attorney, Agent, or Firm* — Morgan, Lewis & Bockius LLP

(57) ABSTRACT

To provide a sound-insulating sheet member capable of being installed in a location with a limited installation space and allowing for insulation of low-frequency sound, and a sound-insulating structure body including the sound-insulating sheet member. A sound-insulating sheet member including a sheet portion having rubber elasticity, and a plurality of protrusion portions that is provided on at least one face of the sheet portion and that has rubber elasticity, in which at least one of the protrusion portions and a region of the sheet portion, where the protrusion portions are provided, contains a space portion.

16 Claims, 26 Drawing Sheets

(51) Int. Cl.
_B32B 25/04_ (2006.01)
_G10K 11/162_ (2006.01)

(56) References Cited

U.S. PATENT DOCUMENTS

| | | | | |
|---|---|---|---|---|
| 2020/0139902 A1* | 5/2020 | Furuzawa | ............... | B60R 13/08 |
| 2020/0143782 A1* | 5/2020 | Honji | ................... | G10K 11/162 |
| 2020/0378111 A1* | 12/2020 | Fishman | ................... | B32B 5/02 |
| 2021/0039361 A1* | 2/2021 | Koshitouge | ............. | B32B 25/08 |
| 2021/0146861 A1* | 5/2021 | Fukumoto | ............... | B60R 13/08 |
| 2021/0193101 A1* | 6/2021 | Sugiura | ................... | B32B 27/40 |

FOREIGN PATENT DOCUMENTS

| | | |
|---|---|---|
| JP | 2019-031899 A | 2/2019 |
| WO | 2017/135409 A1 | 8/2017 |
| WO | 2019/008775 A1 | 1/2019 |
| WO | WO-2019026294 A1 * | 2/2019 ........... G10K 11/172 |
| WO | 2020/050358 A1 | 3/2020 |

OTHER PUBLICATIONS

International Search Report issued in corresponding International Patent Application No. PCT/JP2022/016573 dated Jun. 28, 2022.

International Preliminary Report on Patentability and Written Opinion issued in corresponding International Patent Application No. PCT/JP2022/016573 dated Oct. 12, 2023.

Office Action issued in corresponding European Patent Application No. 22781247.6, dated Apr. 9, 2025.

Extended European Search Report issued in corresponding European Patent Application No. 22781247.6, dated Jul. 16, 2024.

Office Action issued in corresponding European Patent Application No. 22781247.6 dated Aug. 21, 2025.

* cited by examiner $$L + \Delta L \qquad L$$

RESONANT DIRECTION

EXPANSION/CONTRACTION
DIRECTION $L$ $L + \Delta L$

FIG. 13

SOUND-INSULATING SHEET MEMBER AND SOUND-INSULATING STRUCTURE PROVIDED WITH SAME

CROSS-REFERENCE TO RELATED APPLICATION

This is a continuation of International Application PCT/JP2022/016573, filed on Mar. 31, 2022, and designated the U.S., and claims priority from Japanese Patent Application 2021-061252 which was filed on Mar. 31, 2021, the entire contents of which are incorporated herein by reference.

TECHNICAL FIELD

The present invention relates to a sound-insulating sheet member, and a sound-insulating structure body including the same.

BACKGROUND ART

Buildings such as collective housings, office buildings, and hotels are demanded to be quiet suitable for room use by blocking out outdoor noise from vehicles such as automobiles, trains, airplanes, and ships, and facility noise and human noise generated in the buildings. Vehicles such as automobiles, trains, airplanes, and ships are required to be reduced in interior noise in order to block out wind noise and engine noise and then provide quiet and comfortable spaces for passengers. Therefore, there have been progressively researched and developed solutions for blocking out transmission of noise and/or vibration from outdoor to indoor, or from exterior to interior of vehicles, namely, vibration damping/sound-insulating tools. In recent years, lightweight vibration damping/sound-insulating members have been demanded according to verticalization or the like of buildings, and lightweight vibration damping/sound-insulating members have also been demanded for enhancements in energy efficiencies in vehicles. Furthermore, vibration damping/sound-insulating members also capable of responding to complicated shapes have been demanded for enhancements in degrees of design freedom of buildings, vehicles, and facilities therefor.

In general, properties of vibration damping/sound-insulating materials follow the so-called mass law. In other words, the transmission loss as an index of the amount of reduction in noise is determined by the logarithm of the product of the mass of vibration damping/sound-insulating materials and the frequency of elastic waves or sonic waves. Therefore, the mass of vibration damping/sound-insulating materials must be increased in order to increase the amount of reduction in noise of a certain frequency. However, approaches for increasing the mass of vibration damping/sound-insulating materials cause a limitation in the amount of reduction in noise from the restriction on the mass of buildings, vehicles, or the like.

In order to solve the problem of an increase in mass of vibration damping/sound-insulating members, the structures of the members have been conventionally improved. For example, there are known methods of combination use of a plurality of rigid flat plate materials such as gypsum boards, concrete, steel plates, glass plates, and resin plates, and methods of providing hollow double-wall structures or hollow triple-wall structures by use of gypsum boards or the like.

The present applicants have previously proposed a sound-insulating sheet member including a sheet having rubber elasticity, and a resonant portion including a base portion and a weight portion, in order to realize sound-insulating performance exceeding the mass law (Patent Document 1).

RELATED ART DOCUMENT

Patent Document

Patent Document 1: WO2017/135409

SUMMARY OF THE INVENTION

Problems to be Solved by the Invention

The sound-insulating sheet member described in Patent Document 1 is high in degree of design freedom and excellent in general-purpose properties. However, a problem has been that the sheet member, when only changed in size and material of the resonant portion, has a limitation in design, and is difficult to apply in a location with a limited installation space or apply to sound insulation of low-frequency sound. A problem has also been that, when a sheet adheres to an adherend, accumulated air occurs between the adherend and the sheet and the amount of the adhesive applied is heterogeneous.

The present invention has been made in view of such circumstances. An object thereof is to provide a sound-insulating sheet member capable of being installed in a location with a limited installation space and allowing for insulation of low-frequency sound, and a sound-insulating structure body including the sound-insulating sheet member.

An object of the present invention is not limited to the above-mentioned object, and to exert an effect derived from each configuration indicated in the Description of Embodiments described below, the effect having not been achieved by any conventional arts, can be regarded as another object.

Means for Solving the Problems

The present inventors have made intensive studies in order to solve the above problems, and as a result, have found that the above problems are solved by adopting a sheet member in which a protrusion portion is provided on a sheet having rubber elasticity and a specified depression section is provided on the sheet portion, and have thus completed the present invention.

In other words, the present invention provides the following various specific aspects.

[1] A sound-insulating sheet member comprising:
a sheet portion having rubber elasticity; and
a plurality of protrusion portions that is provided on at least one face of the sheet portion and that has rubber elasticity,
wherein at least one of the protrusion portions and a region of the sheet portion, where the protrusion portions are provided, contains a space portion.

[2] The sound-insulating sheet member according to [1], wherein at least the protrusion portions contain a space portion.

[3] The sound-insulating sheet member according to [2], wherein the sheet portion also contains a space portion, and the space portion of the sheet portion is provided so as to penetrate to the space portion of the protrusion portions from a face of the sheet portion, the face being opposite to a face where the protrusion portions are provided.

[4] The sound-insulating sheet member according to [3], wherein the protrusion portions do not contain a through-hole connecting the space portion and an external.

[5] The sound-insulating sheet member according to any of [2] to [4], wherein, in a cross section where an area proportion occupied by the space portion is maximum in a cross section of the protrusion portions in a planar direction of the sheet portion, the proportion is 90% or less.

[6] The sound-insulating sheet member according to any of [2] to [5], wherein, in a cross section where an area proportion occupied by the space portion is maximum in a cross section of the protrusion portions in a planar direction of the sheet portion, the proportion is 20% or more.

[7] The sound-insulating sheet member according to any of [2] to [6], wherein a volume proportion occupied by the space portion in the protrusion portions is 10% or more.

[8] The sound-insulating sheet member according to any of [2] to [7], wherein one part of the space portion of the protrusion portions is provided so as to reach at least any face of a tip face and a side face of the protrusion portions.

[9] The sound-insulating sheet member according to [1] to [8], wherein the protrusion portions contain a weight portion at a tip.

The sound-insulating sheet member according to [9], wherein a ratio $(D_P/D_W)$ of an equivalent diameter $D_P$ of the protrusion portions, represented by the following expression, to an equivalent diameter $D_W$ of the weight portion, represented by the following expression, is 1.25 or more:

$$D_P = 4A_P/p_P$$

$$D_W = 4A_W/p_W$$

$D_P$: the equivalent diameter of the protrusion portions $D_W$: the equivalent diameter of the weight portion $A_P$: an area of a region formed from an outer perimeter of a cross section of the protrusion portions in the planar direction of the sheet portion $A_W$: an area of a region formed from an outer perimeter of a cross section of the weight portion in the planar direction of the sheet portion $p_P$: a length of an outer perimeter of a cross section of the protrusion portions in the planar direction of the sheet portion $p_W$: a length of an outer perimeter of a cross section of the weight portion in the planar direction of the sheet portion.

[11] The sound-insulating sheet member according to [9] or [10], wherein a ratio $(H/D_P)$ of a total value H of a height of the protrusion portions and a thickness of the sheet portion, to $D_P$ represented by the following expression, is 2.1 or less:

$$D_P = 4A_P/p_P$$

$D_P$: the equivalent diameter of the protrusion portions $A_P$: an area of a region formed from an outer perimeter of a cross section of the protrusion portions in the planar direction of the sheet portion $p_P$: a length of an outer perimeter of a cross section of the protrusion portions in the planar direction of the sheet portion.

[12] The sound-insulating sheet member according to any of [9] to [11], wherein at least a part of the weight portion is embedded in the protrusion portions.

[13] The sound-insulating sheet member according to any of [1] to [12], wherein the sound-insulating sheet member is an integrated molded article.

[14] A sound-insulating structure body comprising at least the sound-insulating sheet member according to any of [1] to [13], and a support supporting the sound-insulating sheet member.

The sound-insulating structure body according to [14], wherein the sheet portion and the protrusion portions independently comprise at least one selected from the group consisting of a thermosetting elastomer, a photo-curable elastomer, and a thermoplastic elastomer.

Effects of the Invention

According to the present invention, it is possible to provide a sound-insulating sheet member capable of being installed in a location with a limited installation space and allowing for insulation of low-frequency sound, and a sound-insulating structure body including the sound-insulating sheet member.

BRIEF DESCRIPTION OF THE DRAWINGS

FIG. 13 is a diagram illustrating a simple model indicating an operating principle of the sound-insulating structure body according to the present embodiment.

MODE FOR CARRYING OUT THE INVENTION

Figure 1:
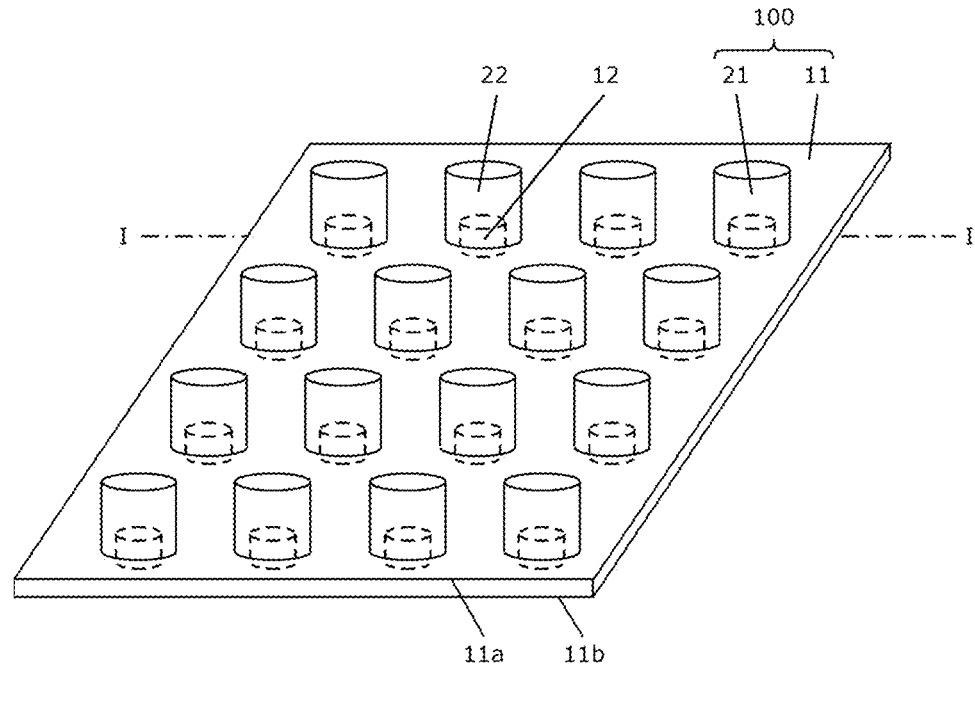
FIG. 1 is a schematic perspective view illustrating a sound-insulating sheet member according to a first embodiment.

Hereinafter, each embodiment of the present invention will be described with reference to the drawings. Each embodiment below is illustrative for describing the present invention, and the present invention is not limited to only such each embodiment. Hereinafter, positional relationships such as top, bottom, left, and right are based on the relationships illustrated in the drawings, unless otherwise particularly noted. The dimensional ratios in the drawings are not limited to any ratios illustrated. Herein, for example, the designation "1 to 100" as a numerical value range encompasses both the lower limit value "1" and the upper limit value "100". The same also applies to the designation of any other numerical value range.

<Sound-Insulating Sheet Member>

A sound-insulating sheet member according to one embodiment of the present invention (also simply referred to as "sound-insulating sheet member".) includes a sheet portion having rubber elasticity, and a plurality of protrusion portions that is provided on at least one face of the sheet portion and that has rubber elasticity, wherein at least one of the protrusion portions and a region of the sheet portion, where the protrusion portions are provided, contains a space portion.

Hereinafter, specific aspects of the present embodiment will be described with reference to the drawings, but not limited thereto. Herein, the "plurality" means two or more.

First Embodiment

Figure 2:
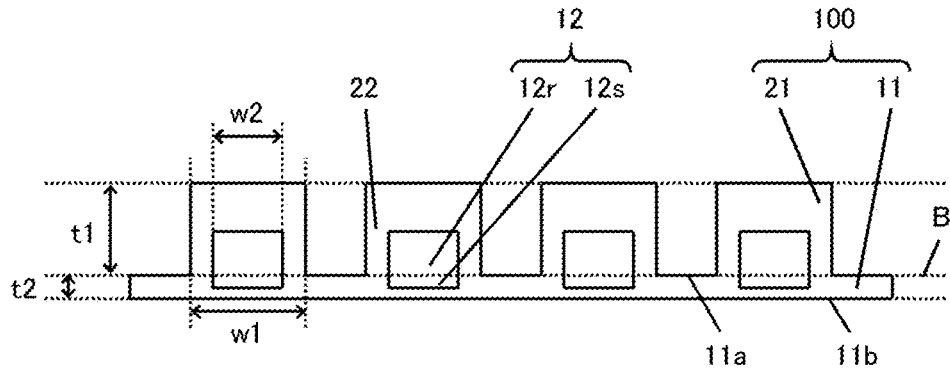
FIG. 2 is an I-I arrow cross-section view of FIG. 1.

FIG. 1 illustrates one example (first embodiment) of a sound-insulating sheet member according to the present embodiment. A sound-insulating sheet member 100 illustrated in FIG. 1 includes a sheet portion 11 having rubber elasticity, and a plurality of protrusion portions 21 that is provided on one face of the sheet portion 11 and that has rubber elasticity, in which at least one of the protrusion portions 21 and a region of the sheet portion 11, where the protrusion portions 21 are provided, contains a space portion 12. The sheet portion 11 has a sheet face 11a and a sheet face 11b. FIG. 2 is an I-I arrow cross-section view of FIG. 1.

A sound-insulating sheet member 100 illustrated in FIG. 2 corresponds to an aspect where both the sheet portion 11 and the protrusion portions 21 contain the space portion 12, in which the protrusion portions 21 are each configured from a protrusion-formed portion 22 that is provided on the circumference of the space portion 12 to form a protrusion shape, and the space portion 12, and the space portion 12 is configured from a space portion 12r of the protrusion portions 21 and a space portion 12s of the sheet portion. A dotted line B illustrated in FIG. 2 is a line indicating a boundary between the sheet portion 11 and the protrusion portions 21. In FIG. 2, t1 represents the height of the protrusion portions 21, t2 represents the thickness of the sheet portion 11, w1 represents the width of the protrusion portions 21, and w2 represents a cross section width of the space portion 12 in a planar direction of the sheet portion.

The region of the sheet portion 11, where the protrusion portions 21 are provided, means a region of the sheet portion 11, overlapped with the protrusion portions 21 in a planar view of the sound-insulating sheet member 100, and means a region of the sheet portion 11, having a width indicated by w1 in FIG. 2.

Herein, the space portion 12 is defined to collectively mean the space portion 12r and the space portion 12s. In other words, the space portion 12 in the description of the protrusion portion 21 means the space portion 12r, the space portion 12 in the description of the sheet portion 11 means the space portion 12s, and the description of the space portion 12 in the case of no especial discrimination applies to both the space portion 12r and the space portion 12s.

Examples of the aspect of the sound-insulating sheet member 100 are illustrated in FIGS. 3(a) to (f).

Figure 3:
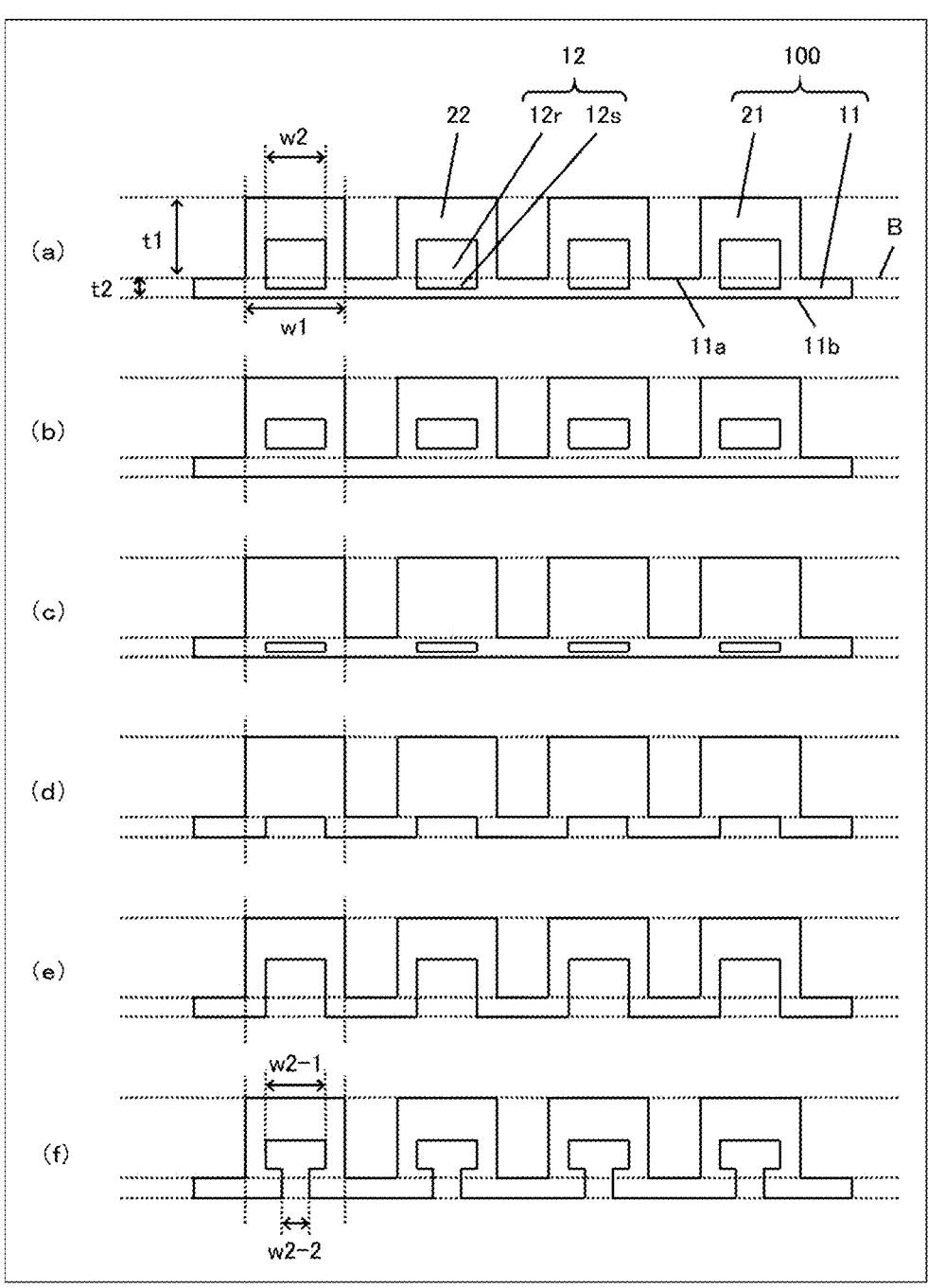
FIG. 3 is a cross-section view of the sound-insulating sheet member according to the first embodiment.

A sound-insulating sheet member 100 illustrated in Panel (a) of FIG. 3 corresponds to an aspect where both the sheet portion 11 and the protrusion portions 21 contain the space portion 12, as in FIG. 2.

A sound-insulating sheet member 100 illustrated in Panel (b) of FIG. 3 corresponds to an aspect where only the protrusion portions 21 contain the space portion 12.

A sound-insulating sheet member 100 illustrated in Panel of (c) of FIG. 3 corresponds to an aspect where only the sheet portion 11 contains the space portion 12.

A sound-insulating sheet member 100 illustrated in Panel (d) of FIG. 3 corresponds to an aspect where only the sheet portion 11 contains the space portion 12 and a part of the space portion 12 is provided so as to reach a surface of the sheet portion, the surface being opposite to a surface where the protrusion portions are provided.

A sound-insulating sheet member 100 illustrated in Panel (e) of FIG. 3 corresponds to an aspect where both the sheet portion 11 and the protrusion portions 21 contain the space portion 12 and the space portion 12 is provided so as to penetrate to the space portion 12 of the protrusion portions 21 from a face of the sheet portion 11, the face being opposite to a face where the protrusion portions 21 are provided. This aspect is preferable from the viewpoint that both ease of molding and sound-insulating performance are satisfied.

A sound-insulating sheet member 100 illustrated in Panel (f) of FIG. 3 corresponds to an aspect where the sheet member has the same configuration as that of the sound-insulating sheet member 100 in Panel (e) of FIG. 3 and a cross section width w2-2 of the space portion 12s of the sheet portion, in the planar direction of the sheet portion, is smaller than a cross section width w2-1 of the space portion 12r of the protrusion portions, in the planar direction of the sheet portion.

When the protrusion portions contain the space portion, an aspect may also be adopted where the protrusion portions do not contain a through-hole connecting the space portion and an external. The through-hole is a through-hole directly connecting the protrusion portions and an external, and is not directed to a through-hole connecting the space portion of the protrusion portions and an external via the sheet portion as illustrated in Panel (e) of FIG. 3. This aspect is preferable from the viewpoint of an enhancement in sound-insulating performance.

For example, when sonic wave is incident from a noise source located facing the sheet portion 11 of the sound-insulating sheet member 100, vibration of the sheet portion 11 and/or the protrusion portions 21 occurs. When the frequency of the sonic wave incident and the resonant frequency of the protrusion portions 21 are approximate or the same, the protrusion portions resonate and violently vibrate. The directions of two forces here acting on the sheet portion 11, force 1) generated by the sonic wave and force 2) generated by the vibration of the protrusion portions 21, are opposite to thereby suppress the vibration of the sheet portion 11. As a result, high sound-insulating performance exceeding the mass law is obtained.

The sound-insulating sheet member 100 according to the present embodiment achieves favorable sound-insulating performance in a smaller size than that of a common sound-insulating member and thus is easily reduced in height, and can be applied with the protrusion portions, the space portion and the sheet portion being appropriately changed in terms of size and shape depending on the installation environment and conditions and thus can be installed in a location with a limited installation space.

Hereinafter, each component of the sound-insulating sheet member 100 will be described in detail.

[Sheet Portion]

A sheet portion 11 is a sheet portion having rubber elasticity and is not particularly limited in terms of a mode thereof, and may be one having rubber elasticity due to molecular motion or the like of a resin (organic polymer). The sheet portion 11 can also serve as a vibrator (resonator) that vibrates at a certain frequency when sonic wave is incident from a noise source. The sheet portion 11 may contain a space portion 12. The space portion 12 may be contained so as to be present only in the sheet portion 11 as illustrated in Panel (c) of FIG. 3, may be contained so as to partially reach a surface of the sheet portion, the surface being opposite to a surface where the protrusion portions are provided, as illustrated in Panel (d) of FIG. 3, or may be contained so as to be integrated with the space portion contained in the protrusion portions 21 as illustrated in Panel (a) of FIG. 3.

The material constituting the sheet portion 11 preferably contains at least one selected from the group consisting of a thermosetting elastomer, a photo-curable elastomer, and a thermoplastic elastomer from the viewpoint of imparting rubber elasticity to the sheet portion.

In the case of production by casting with a metal mold or the like, an elastomer is needed to be packed in a cavity of a mold surface, and a photo-curable elastomer is more preferable because a liquid thereof having a relatively low viscosity before curing can be packed in the cavity and the packing rate can be increased.

Specific examples of the material constituting the sheet portion 11 include:

a thermosetting resin-based elastomer, for example, a vulcanized thermosetting resin-based elastomer, a ure-thane-based thermosetting resin-based elastomer, a sili-cone-based thermosetting resin-based elastomer, a fluorine-based thermosetting resin-based elastomer, or an acrylic thermosetting resin-based elastomer, such as natural rubber or synthetic rubber chemically cross-linked;

a photo-curable elastomer such as an acrylic photo-curable elastomer, a silicone-based photo-curable elas-tomer, or an epoxy-based photo-curable elastomer; or a thermoplastic elastomer such as an olefin-based ther-moplastic elastomer, a styrene-based thermoplastic elastomer, a vinyl chloride-based thermoplastic elasto-mer, a urethane-based thermoplastic elastomer, an ester-based thermoplastic elastomer, an amide-based thermoplastic elastomer, a silicone-based thermoplastic elastomer, or an acrylic thermoplastic elastomer.

Further specific examples of the thermosetting elastomer, the photo-curable elastomer, and the thermoplastic elasto-mer include rubber. Specific examples include natural rub-ber, isoprene rubber, butadiene rubber, styrene-butadiene rubber, chloroprene rubber, nitrile rubber, polyisobutylene rubber, ethylene-propylene rubber, chlorosulfonated poly-ethylene rubber, acrylic rubber, fluororubber, epichlorohy-drin rubber, polyester rubber, urethane rubber, or silicone rubber, or any modified product thereof, but not limited thereto. These can be used singly or in combination of two or more kinds thereof.

In particular, natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluo-rorubber, epichlorohydrin rubber, polyester rubber, urethane rubber, silicone rubber and modified products thereof are preferable, and silicone rubber or acrylic rubber, or any modified product thereof is more preferable. Such a material is used to result in a tendency to allow heat resistance and cold resistance to be excellent.

The sheet portion 11 may contain various additives such as a flame retardant, an antioxidant, a plasticizer, or a colorant, as long as it is a so-called sheet having rubber elasticity.

The flame retardant is an additive to be compounded for allowing a flammable material to be hardly burned or not to be set on fire. Specific examples thereof include bromine compound such as pentabromodiphenyl ether, octabromo-diphenyl ether, decabromodiphenyl ether, tetrabromobisphe-nol A, hexabromocyclododecane, or a hexabromobenzene, a phosphorus compound such as triphenyl phosphate, a chlo-rine compound such as chlorinated paraffin, an antimony compound such as antimony trioxide, a metal hydroxide such as aluminum hydroxide, a nitrogen compound such as melamine cyanurate, or a boron compound such as sodium borate, but not limited thereto.

The antioxidant is an additive to be compounded for preventing oxidation degradation. Specific examples thereof include a phenol-based antioxidant, a sulfur-based antioxi-dant, or a phosphorus-based antioxidant, but not limited thereto.

The plasticizer is an additive to be compounded for improving flexibility and weather resistance. Specific examples thereof include phthalate, adipate, trimellitate, polyester, phosphate, citrate, sebacate, azelate, maleate, sili-cone oil, mineral oil, or plant oil, or any modified product thereof, but not limited thereto.

Furthermore, examples of the colorant include a dye and a pigment.

Such various additives can be used singly or in combi-nation of two or more kinds thereof.

While the sheet portion 11 in the sound-insulating sheet member 100 illustrated in FIG. 1 is formed in a square shape in a planar view, the shape thereof is not particularly limited. Any shape in a planar view, for example, a triangular shape, an oblong shape, a rectangular shape, a trapezoidal shape, a diamond shape, a polygonal shape such as a pentagonal shape or a hexagonal shape, a round shape, an elliptical shape, or an indefinite shape not classified therein can be adopted.

The thickness t2 of the sheet portion 11 is not particularly limited, and can be appropriately set. When the thickness t2 of the sheet portion 11 is thick, the resonant frequency of the protrusion portions 21 tends to be shifted to a low frequency, and when the thickness t2 of the sheet portion 11 is thin, the resonant frequency of the protrusion portions 21 tends to be shifted to a high frequency.

The thickness of the sheet portion 11 is preferably 10 μm or more, more preferably 50 μm or more, further preferably 100 μm or more from the viewpoint of sound-insulating performance, mechanical strength, flexibility, handling ability, or the like. The thickness of the sheet 11 is preferably 2 mm or less, more preferably 1 mm or less, further preferably 500 μm or less. Here, the thickness of the sheet portion 11 is not necessarily uniform in the entire sheet portion, and, for example, the sheet portion may be inclined depending on the aspect where the sound-insulating sheet member 100 is installed, or may be inclined if sound-insulating performance is desired to be partially higher or lower, as long as the sheet portion is recognized as a sheet. When the thickness of the sheet portion is not uniform, the thickness t2 of the sheet portion 11 can be calculated as an average value. Herein, the thickness of the sheet portion 11 is preferably uniform from the viewpoint of ease of molding or securement of stable sound-insulating performance.

The sheet portion 11 has a Young's modulus of preferably 0.01 MPa or more, more preferably 0.1 MPa or more, and has a Young's modulus of preferably 100 MPa or less, more preferably 10 MPa or less, from the viewpoint of sound-insulating performance, mechanical strength, flexibility, handling ability, productivity, or the like.

Herein, the Young's modulus means the ratio between the force (stress) acting per unit cross-section area and the deformation rate (strain) of a sample in the application of an external force in a uniaxial direction, and means a value of the storage normal modulus at 25° C. and 10 Hz, measured according to a forced vibration non-resonance method of JIS K 6394:2007 "Rubber, vulcanized or thermoplastic-Determination of dynamic properties-".

The sheet portion 11 preferably has a glass transition temperature of 0° C. or less from the viewpoint of a reduction in temperature dependence of sound-insulating properties at low temperature. A lower glass transition temperature of the sheet portion 11 tends to result in an increase in cold resistance and a decrease in temperature dependence of the elastic modulus around 0° C., hardly causing sound-insulating performance to depend on the environment temperature. The glass transition temperature of the sheet portion 11 is more preferably −10° C. or less, further preferably −20° C. or less, particularly preferably −30° C. or less. Herein, the glass transition temperature of the sheet portion 11 means a peak temperature of a loss tangent in the dynamic viscoelasticity measurement at a frequency of 10 Hz, in particular, temperature dependence measurement.

[Protrusion Portion]

A plurality of protrusion portions 21 is provided on the sheet portion 11, and serves as a vibrator (resonator) that vibrates at a certain frequency when sonic wave is incident from a noise source. The protrusion portions 21 may contain a space portion 12, and, for example, may be each configured from a space portion 12 continuous from a sheet portion 11 and a protrusion-formed portion 22 covering the circumference of the space portion 12, as in the sound-insulating sheet member 100 illustrated in FIG. 2. The protrusion portions 21 effectively function as a resonator where a tip part of the protrusion-formed portion 22, in particular, a tip part against the space portion 12 acts as a weight and a rear end part of the protrusion-formed portion 22 acts as a spring. Each parameter of the protrusion portions 21, described below, represents the average value with respect to each parameter of a plurality of the protrusion portions, unless otherwise especially noted. The tip part of the protrusion portions 21 (protrusion-formed portion 22) may be a region of a range generally recognized as a tip, specifically may be a region corresponding to 50% from the tip of the entire region of the protrusion portions 21 in a height direction of the protrusion portions 21, or may be a region located at the tip against an end of the space portion, the end facing the sheet, when the protrusion portions contain the space portion, and is preferably defined by the latter from the viewpoint that the effects of the present invention are ensured.

The protrusion portions 21 may be provided on at least any one face of the sheet portion 11, may be provided on only one face thereof or both faces thereof, and are preferably provided on both faces thereof from the viewpoint of an enhancement in high sound-insulating performance. Herein, when a support described below is provided to form a sound-insulating structure body, the protrusion portions 21 are preferably provided on only one face of the sheet portion 11 from the viewpoint of ease of production and stabilization of performance.

When a plurality of the protrusion portions is provided on both faces of the sheet portion, each parameter with respect to the protrusion portions herein is handled as each parameter of a plurality of the protrusion portions provided on one face, unless otherwise especially noted. For example, conditions of the height of the protrusion portions, described below, are applied to each parameter (specifically, its average value) of a plurality of the protrusion portions provided on one face of the sheet portion. Each parameter of the sound-insulating sheet member in this aspect is handled as each parameter of the entire sound-insulating sheet member including the entire protrusion portions on both faces of the sheet portion.

The arrangement of the protrusion portions 21, the number thereof disposed, the size thereof, and the like can be appropriately set depending on the desired performance, and are not particularly limited. The protrusion portions 21 are provided in contact with at least one surface of the sheet portion 11. For example, while a plurality of the protrusion portions 21 are placed at an equal interval in a lattice manner in the sound-insulating sheet member 100 illustrated in FIG. 1, the arrangement of the protrusion portions 21 is not particularly limited. A plurality of the protrusion portions 21 may be arranged, for example, in a staggered manner or randomly. A sound-insulating mechanism by the sound-insulating sheet member according to the present embodiment does not utilize Bragg scattering unlike a so-called phononic crystal, and thus the protrusion portions 21 are not necessarily arranged at regular and periodic intervals.

The number of the protrusion portions 21 disposed per unit area is not particularly limited as long as a plurality of the protrusion portions 21 can be arranged so as not to mutually interfere by contact thereof.

The maximum number of the protrusion portions 21 per unit area is varied depending on the shape or the like of the protrusion portions 21, and, for example, is preferably 100 or less per 100 cm 2 when not only the protrusion portions 21 are cylindrical and the height direction of such cylinders is disposed in parallel with the sheet normal direction, but also the cross section diameter of such cylinders is 1 cm.

The minimum number of the protrusion portions 21 per unit area is preferably 2 or more, more preferably 10 or more, further preferably 50 or more per 100 cm 2, for example, when not only the protrusion portions 21 are cylindrical and the height direction of such cylinders is disposed so as to be in parallel with the sheet normal direction, but also the cross section diameter is 1 cm. When the number of the protrusion portions 21 disposed is equal to or more than the above preferable lower limit, there is a tendency to impart higher sound-insulating performance. When the number is equal to or less than the above preferable upper limit, a reduction in weight of the entire sheet is easily achieved.

The height of a plurality of the protrusion portions 21 (the length of the sheet portion 11 in the normal direction) may or may not be uniform, and is preferably uniform from the viewpoint of ease of molding and/or securement of stable sound-insulating performance. The height of the highest protrusion portion among a plurality of the protrusion portions 21 (the maximum height of the protrusion portions 21) can be appropriately set depending on the desired performance, and is not particularly limited. The maximum height of the protrusion portions 21 is preferably 100 μm or more, more preferably 500 μm or more, further preferably 1 mm or more, and preferably 50 mm or less, more preferably 40 mm or less, further preferably 30 mm or less, from the viewpoint of enhancements in ease of molding and productivity. The above preferable numerical value range is satisfied to result in a tendency to improve releasability of the sheet 11 (namely, sound-insulating sheet member 100) where the protrusion portions 21 are provided.

The cross-section area of a protrusion portion having the maximum area, in cross sections of protrusion portions contained in a face in parallel with the sheet face 11a of the sheet portion 11 at a height position at which the total cross-section area of a plurality of the protrusion portions 21 is maximum, is preferably 8000 mm 2 or less, more preferably 2000 mm 2 or less, further preferably 500 mm 2 or less, and the cross-section area of a protrusion portion having the minimum area, in such cross sections, is preferably 50 μm 2 or more, more preferably 8000 μm 2 or more, further preferably 0.15 mm 2 or more.

When the protrusion portions are cylindrical as illustrated in FIG. 1, the diameter of a circle having the maximum diameter, in cross sections of protrusion portions contained in a face in parallel with the sheet face 11a of the sheet portion 11 at a height position at which the total cross-section area of a plurality of the protrusion portions 21 is maximum, is preferably 100 mm or less, more preferably mm or less, further preferably 25 mm or less. The diameter of a circle having the minimum diameter, in such cross sections, is preferably 10 μm or more, more preferably 100 μm or more, further preferably 1 mm or more. The cross-section area of the protrusion portions 21 and the diameter of a circle in the case of a cylinder are in the above preferable numerical value ranges, to result in tendencies to enable the number of the protrusion portions 21 disposed on the sheet face 11a of the sheet portion 11 to be ensured to a predetermined number or more, enable more favorable sound-insulating performance to be obtained, and further enhance also ease of molding and productivity.

While a plurality of the protrusion portions 21 are provided on at least one face of the sheet portion 11, the material constituting the protrusion portions 21, the arrangement of the protrusion portions 21, the shape and the size thereof, the direction of the protrusion portions 21 disposed, and the like are not each necessarily the same in all a plurality of the protrusion portions 21. There is a case where such a plurality of the protrusion portions 21, including at least one different protrusion portion, is disposed to thereby impart the effect of, for example, expanding a frequency region that allows high sound-insulating performance to be exhibited.

[Space Portion]

A space portion 12 may be provided on at least one of the protrusion portions 21 and a region of the sheet portion 11, where the protrusion portions 21 are provided, and is preferably provided on at least the protrusion portions 21 in order that favorable sound-insulating performance is obtained, and is preferably provided on both the protrusion portions 21 and the region of the sheet portion 11, where the protrusion portions 21 are provided, and, in particular, one space portion 12 is preferably provided so as to be bridged over both a protrusion portion 21 and a region of the sheet portion 11, where this protrusion portion 21 is provided. For example, as illustrated in FIG. 1, the space portion 12, which has a substantially cylindrical shape, may be provided continuously on the sheet portion 11 and the protrusion portions 21. Herein, a region of combination of the protrusion portions and a region of the sheet portion, where such protrusion portions are provided, is also referred to as "composite region".

Figure 4:
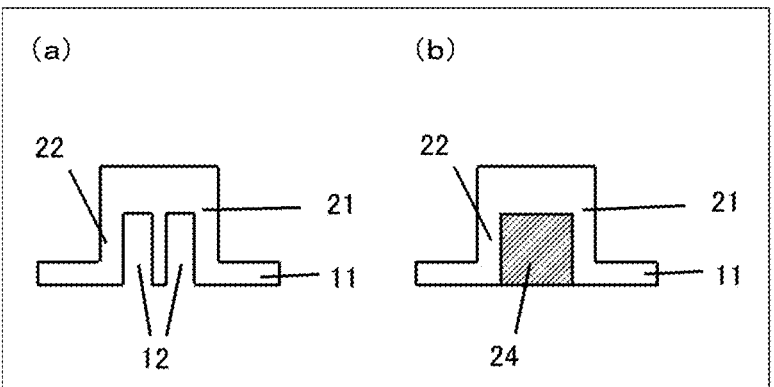
FIG. 4 is a cross-section view of a sound-insulating sheet member, the schematic diagram illustrating one aspect of a space portion.

The shape of the space portion 12 is not particularly limited, and any shape such as a triangular prism shape, a rectangular prism shape, a trapezoidal prism shape, a polygonal prism shape such as a pentagonal prism or hexagonal prism shape, a cylindrical shape, an elliptical cylindrical shape, a truncated pyramid shape, a truncated cone shape, a polygonal pyramid shape, or a circular cone shape, or an indefinite shape not classified therein can be adopted. The number of such space portions 12 in such each composite region is not limited to 1, and the space portion may be, for example, divided as in Panel (a) of FIG. 4. The space portion 12 is not necessarily constituted from only air, and may be internally provided with, for example, an acoustic absorbent 24 such as a foam or an unwoven cloth as in Panel (b) of FIG. 4, as long as resonance of the protrusion portions 21 is not inhibited.

While the sound-insulating sheet member 100 can contain the space portion to thereby obtain the effect of a reduction in resonant frequency or a reduction in height, the sound-insulating sheet member can be according to an aspect where at least the sheet portion 11 contains the space portion 12 and a part of the space portion 12 is provided so as to reach a surface of the sheet portion 11, the surface being opposite to a surface where the protrusion portions 21 are provided, as illustrated in Panel (d) of FIG. 3, Panel (e) of FIG. 3 or Panel (f) of FIG. 3, to thereby obtain the following further effects.

When sound-insulating sheet member 100 is provided on a support that supports the member, air is sometimes inserted between the sheet portion 11 and an adherend. However, when the sound-insulating sheet member 100 is according to an aspect where at least the sheet portion 11 contains the space portion 12 and a part of the space portion 12 is provided so as to reach a surface of the sheet portion 11, the surface being opposite to a surface where the protrusion portions 21 are provided, as illustrated in Panel (d) of FIG. 3, Panel (e) of FIG. 3 or Panel (f) of FIG. 3, the space portion is present at a part of a contact part between the sound-insulating sheet member and the support and thus accumulated air can be escaped to the space portion and an adhesive can be packed between the sound-insulating sheet member 100 and the adherend. Therefore, the sound-insulating sheet member 100 can be inhibited from being peeled, and is excellent in stability as compared with the case where no space portion is present at a part of a contact part between the sound-insulating sheet member and the support.

When the adhesive is applied for adhesion of the sound-insulating sheet member and the support, a variation in the thickness of the adhesive is sometimes caused. However, the sound-insulating sheet member 100 in Panel (d) of FIG. 3, Panel (e) of FIG. 3 or Panel (f) of FIG. 3 can allow an excess of the adhesive in leveling of the thickness of the adhesive to be escaped to a depression section under the sheet, and can allow the thickness of an adhesion layer to be uniform.

Another problem is that sink is sometimes generated at a rear end of the protrusion portions 21 due to curing contraction and/or thermal contraction of a resin depending on the shape and the forming method of the protrusion portions 21. If sink is generated, the thickness of an adhesion layer applied can be ununiform, but the sound-insulating sheet member 100 in Panel (d) of FIG. 3, Panel (e) of FIG. 3 or Panel (f) of FIG. 3 does not cause ununiformity itself of adhesion because a part where sink is to be generated is originally hollowed. It has been found from previous studies of the inventors that the thickness of the adhesion layer has an influence on sheet performance, and the sound-insulating sheet member 100 in Panel (d) of FIG. 3($d$), Panel (e) of FIG. 3 or Panel (f) of FIG. 3, which can allow the thickness of the adhesion layer to be uniform, is excellent in stability of sheet performance as compared with the case where no space portion is present at a part of a contact part between the sound-insulating sheet member and the support.

The amount of sink in the protrusion portions in the case of evaluation of the sink according to the following method is not especially restricted, and is usually 200 μm or less, preferably 100 μm or less, more preferably 50 μm or less. The lower limit, although no preferable range thereof is present, may be 1 μm or more.

(Method for Evaluating Amount of Sink)

Figure 5:
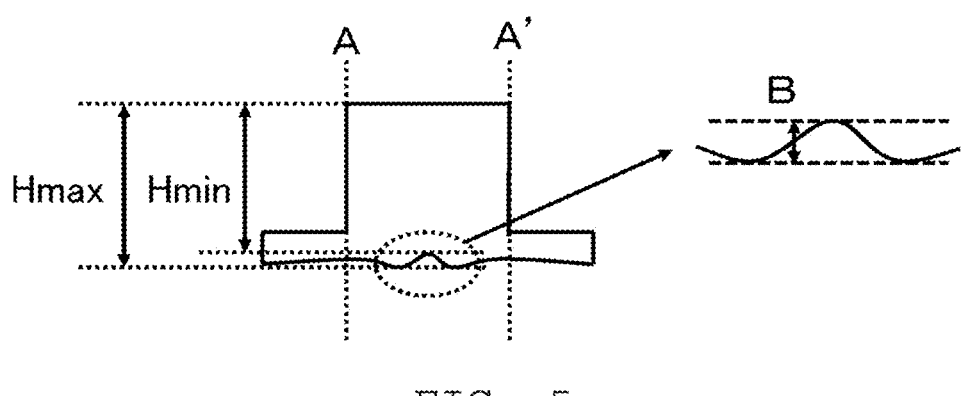
FIG. 5 is a diagram describing a method for evaluating the amount of sink.

The amount B of sink can be evaluated with calculation using the following expression, by calculating the maximum value (Hmax) and the minimum value (Hmin) of the height H of the composite region (the sum of the height of the protrusion portions in a direction perpendicular to the planar direction of the sheet portion and the thickness of the sheet portion) in the case where the sound-insulating sheet member where the upper face of the protrusion portions is fixed is retained in an environment at 170° C. and then dropped in temperature to 25° C. Parameters, Hmax, Hmin, and B are illustrated in FIG. 5. Herein, the composite region means a region surrounded by a line segment A and a line segment A' in FIG. 5.

Amount $B$of sink(μm)=(Maximum value Hmax(μm)
of height of composite region)−(Minimum
value Hmin(μm) of height of composite region)

An additional advantage is that production is easy because, as in Panel (d) of FIG. 3 and Panel (e) of FIG. 3, the cross-section area of a cross section of the space portion 12 in the planar direction of the sheet portion is constant or substantially constant or a part where the cross-section area of the space portion 12 is increased is not present toward the space portion 12 from a surface of the sheet portion 11, the surface being opposite to a surface where the protrusion portions 21 are provided. Such a part where the cross-section area is increased is not present, and thus a production method with use of a mold 61a containing a depression and a mold 61b containing a protrusion as in FIG. 17 can be used.

The space portion 12 is formed at a position corresponding to a protrusion portion on an opposite sheet face to a sheet face where the protrusion portions 21 are provided, and thus the protrusion portions 21 can be reduced in resonant frequency or the protrusion portions 21 can be reduced in height. It is here indicated that, in comparison with any protrusion portion 21 not containing the space portion 12, a reduction in frequency can be achieved in comparison in resonant frequency between the same protrusion portion outer shapes and a reduction in height can be achieved in comparison in height between protrusion portion shapes exhibiting the same resonant frequency. The effects are similar and will be described in detail.

Figure 6:
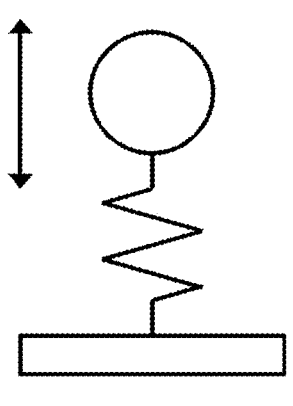
FIG. 6 is a diagram illustrating a simple model indicating an operating principle of the sound-insulating structure body according to the present embodiment.

The present feature can be noted with a spring-mass model where the protrusion portions 21 are expressed as a resonator with a spring portion illustrated in FIG. 6, as a unit. An arrow in FIG. 6 indicates a resonant direction. In FIG. 6, a circle sign corresponds to a tip part of the protrusion portions 21, in particular, a tip part against the space portion 12 of the protrusion portions 21, a spring sign corresponds to a rear end part of the protrusion portions 21, in particular, a protrusion-formed portion 22 on the circumference of the space portion 12 in the case of the space portion 12 reaching the sheet portion 11, and a quadrangular sign indicates the adherend. When the mass of the tip part of the protrusion portions 21 is designated as M and the spring rate of the rear end part of the protrusion portions 21 is designated as K, the resonant frequency of the protrusion portions 21 can be designated as "$f \propto (K/M)^{1/2}$", and the resonant frequency f of the protrusion portions 21 is found to be proportional to the one-half power of the spring rate K.

Figure 7:
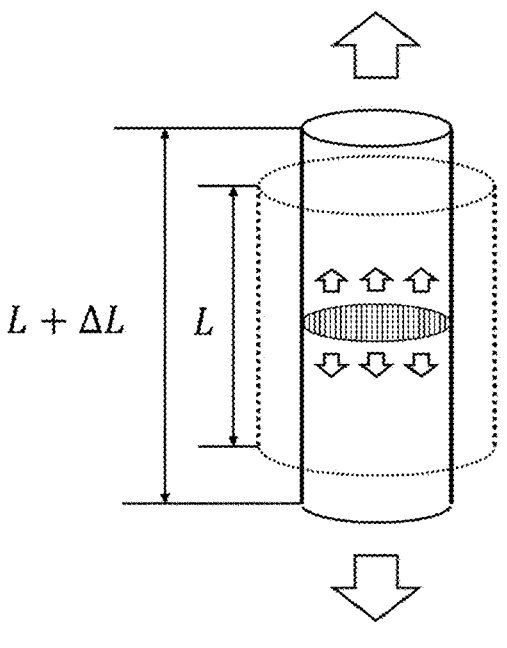
FIG. 7 is a diagram illustrating a simple model indicating an operating principle of the sound-insulating structure body according to the present embodiment.

In order to reveal a corresponding relationship between the spring-mass model, and the shape of the protrusion portions and material properties, the description will be made with reference to a model illustrated in FIG. 7. First, the protrusion portions 21 are assumed as a rod-like spring of a shape where a space portion such as a cylinder or a prism is not contained and the protruded portion cross-section area is constant. In this case, a relationship between a weight F and an elongation L of the rod-like spring is expressed by the following expression. An arrow in FIG. 7 indicates a resonant direction.

$$\Delta F = (EA\Delta L/L)$$

E (MPa): storage modulus
A (mm$^2$): protrusion portion cross-section area
L (mm): height of resin spring portion
ΔL (mm): elongation in application of weight F In the expression, the spring rate K is expressed by K=EA/L from the relationship of ΔF/ΔL=K. Accordingly, it is found that the spring rate K is proportional to the cross-section area A of the protrusion portions 21. As described above, it can be seen that the resonant frequency f of the protrusion portions 21 is proportional to the one-half power of the spring rate K and thus the resonant frequency f of the protrusion portions 21 is proportional to the one-half power of the cross-section area A of the protrusion portions 21. When the protrusion portions 21 contain the space portion 12, the cross-section area A of the protrusion portions 21 is decreased depending on the proportion of the space portion 12, and thus the resonant frequency f of the protrusion portions 21 is also reduced. Therefore, the presence of the space portion 12 can reduce the resonant frequency of the protrusion portions 21.

It is also found from the relationship of K=EA/L that the spring rate K is in reverse proportion to the height L of the resin spring portion. In other words, the height of the protrusion portions 21 is required to be increased for a reduction in frequency due to adjustment of the protrusion portion outer shape. On the other hand, the space portion 12 can be provided to result in a reduction in frequency as described above, and thus the protrusion portions 21 can be reduced in height without any need for the change in height of the protrusion portions 21.

The proportion of the space portion 12 relative to the sheet portion 11 and the protrusion portions 21 is not particularly limited as long as the scope of the present embodiment is satisfied. The proportion of the space portion 12 can be appropriately set so that the resonant frequency of the protrusion portions 21 is fitted with a desired sound insulation frequency region. When the proportion of the space portion 12 is high, the resonant frequency of the protrusion portions 21 tends to be largely shifted to a low frequency, but the proportion of the protrusion-formed portion 22 is decreased to result in a reduction in strength of the protrusion portions 21. When the proportion of the space portion 12 is low, the proportion of the protrusion-formed portion 22 is increased and thus strength of the protrusion portions 21 can be increased, but shifting of the resonant frequency of the protrusion portions 21 to a low frequency tends to be small.

The proportion of a cross section where the area proportion occupied by the space portion 12 is maximum in a cross section of the protrusion portions 21 in the horizontal direction is preferably 20% or more, more preferably 30% or more, further preferably 40% or more from the viewpoint of sound-insulating performance. The proportion is preferably 90% or less, more preferably 85% or less, further preferably 80% or less from the viewpoint of mechanical strength, handling ability, and the like.

The volume proportion occupied by the space portion 12 in the protrusion portions 21 is preferably 10% or more, more preferably 20% or more, further preferably 30% or more, and preferably 80% or less, more preferably 75% or less, further preferably 70% or less from the viewpoint of sound-insulating performance.

The volume proportion occupied by the space portion 12 in the composite region of combination of the protrusion portions 21 and the region of the sheet portion 11, where the protrusion portions 21 are provided, is preferably 10% or more, more preferably 20% or more, further preferably 30% or more, and preferably 80% or less, more preferably 75% or less, further preferably 70% or less from the viewpoint of sound-insulating performance.

[Protrusion-Formed Portion]

A plurality of protrusion-formed portions 22 is in contact with and provided on the sheet face 11a of the sheet portion 11, and provided on the circumference of the space portion 12 to form a protrusion shape. The outer shape and outer shape parameters of the protrusion-formed portions 22 are the same as the outer shape and outer shape parameters of the protrusion portions 21.

The material of the protrusion-formed portions 22 (protrusion portions 21) is not particularly restricted as long as the above required properties are satisfied, and may be the same as or different from the material of the sheet portion and can be independently selected. Examples include at least one selected from the group consisting of a thermosetting elastomer, a photo-curable elastomer, a thermoplastic elastomer, a thermosetting resin, a photo-curable resin, and a thermoplastic resin.

In particular, a thermosetting elastomer, a photo-curable elastomer, and a thermoplastic elastomer are preferable from the viewpoint of imparting rubber elasticity, and examples of the type thereof include those exemplified with respect to the above-mentioned sheet portion 11.

Examples of the thermosetting resin or the photo-curable resin include an acrylic thermosetting resin, a urethane-based thermosetting resin, a silicone-based thermosetting resin, or an epoxy-based thermosetting resin. Examples of the thermoplastic resin include a polyolefin-based thermoplastic resin, a polyester-based thermoplastic resin, an acrylic thermoplastic resin, a urethane-based thermoplastic resin, or a polycarbonate-based thermoplastic resin.

Specific examples of the resin include polymers such as polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, an epoxy resin, and an oxazine resin, but not limited thereto.

Specific examples of elastomers include vulcanized rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber and modified products thereof, polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, an epoxy resin, or an oxazine resin, such as natural rubber or synthetic rubber chemically crosslinked, but not limited thereto.

In particular, natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber and modified products thereof are preferable, and silicone rubber, acrylic rubber and modified products thereof are more preferable from the viewpoint of imparting excellent heat resistance and cold resistance.

The above materials can be used singly or in combination of two or more kinds thereof.

In particular, the material of the protrusion-formed portions 22 is preferably the same as that of the above-mentioned sheet portion 11, and is particularly preferably an elastomer compound. When the sheet portion 11 and the protrusion-formed portions 22 contain the same elastomer compound, integral molding of the sheet portion 11 and the protrusion-formed portions 22 is facilitated and productivity is dramatically increased. In other words, one of particularly preferable aspects is that both the sheet portion 11 and the protrusion portions 21 (protrusion-formed portions 22) contain at least one selected from the group consisting of a thermosetting elastomer, a photo-curable elastomer, and a thermoplastic elastomer to form an integrated molded product.

The protrusion-formed portions 22 can also be a two-color molded body or a multi-color molded body, made of two or more materials. In this case, the same elastomer compound as in the above-mentioned sheet portion 11 is adopted in a part (rear end) of the protrusion-formed portions 22, the part being in contact with the sheet portion 11, and thus integral molding of the sheet portion 11 and the protrusion-formed portions 22 is facilitated.

17

Second Embodiment

Figure 8:
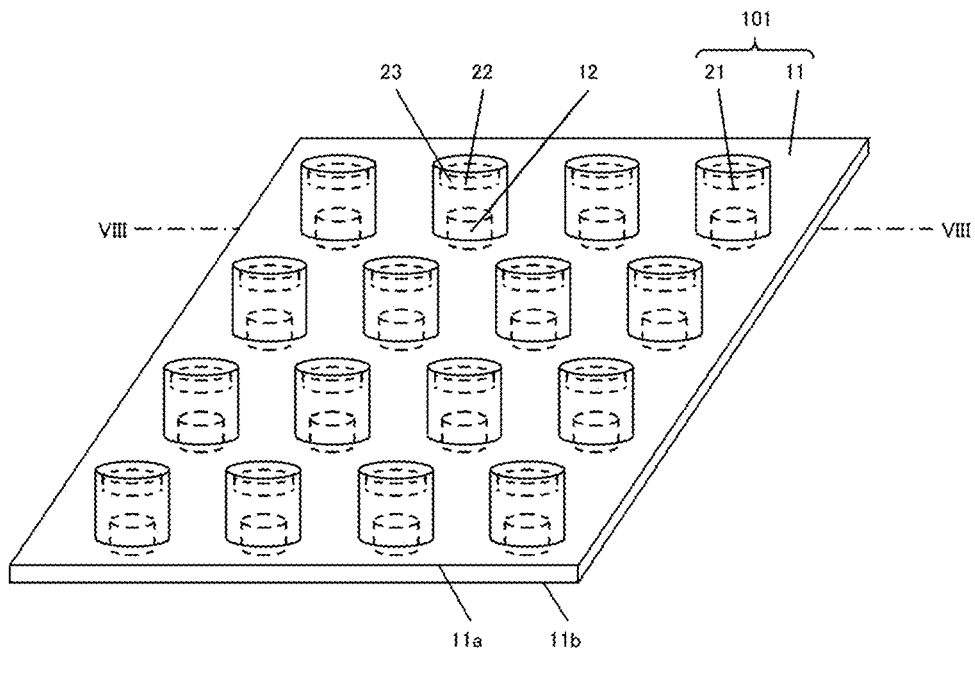
FIG. 8 is a schematic perspective view illustrating a sound-insulating sheet member according to a second embodiment.
Figure 9:
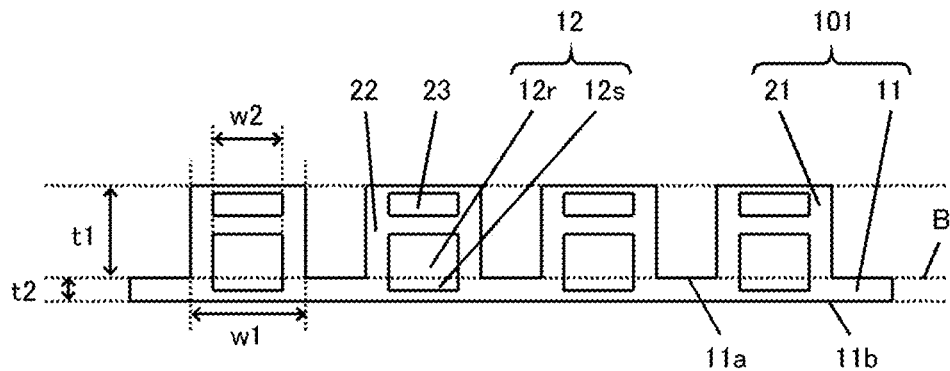
FIG. 9 is a VIII-VIII arrow cross-section view of FIG. 8.

FIG. 8 illustrates another example (second embodiment) of the sound-insulating sheet member according to the present embodiment. A sound-insulating sheet member 101 illustrated in FIG. 8 includes a sheet portion 11 having rubber elasticity, and a plurality of protrusion portions 21 that is provided on one face of the sheet portion 11 and that has rubber elasticity, in which at least one of the protrusion portions 21 and a region of the sheet portion 11, where the protrusion portions 21 are provided, contains a space portion 12, and furthermore the protrusion portions 21 contain a weight portion at a tip. FIG. 9 is a VIII-VIII arrow cross-section view of FIG. 8.

The present embodiment has the same configuration as in the sound-insulating sheet member 100 of the first embodiment except that a weight portion 23 is provided at the tip of the protrusion portions 21, and thus the description overlapped is here omitted.

[Weight Portion]

A weight portion 23 is not particularly limited as long as it has a higher density than that of the above-mentioned protrusion-formed portions 22. A weight portion 23 in a sound-insulating sheet member 100 illustrated in FIG. 8 is formed to have a substantially cylindrical shape where the maximum diameter is smaller than that of the protrusion-formed portions 22, and is embedded in the protrusion-formed portions 22 at the tip of the protrusion portions 21. A configuration is thus adopted where the weight portion 23 thus serving as the weight of the resonator is supported by the protrusion-formed portions 22 for determination of the spring rate, and therefore the resonant frequency of the protrusion portions 21 can be controlled, for example, by adjustment of the spring rate due to the change in shape or material (elastic modulus, mass) of the protrusion-formed portions 22, or by the change in mass of the weight portion 23. In general, when the elastic modulus of the protrusion-formed portions 22 is small, the resonant frequency of the protrusion portions 21 tends to be shifted to a low frequency. When the mass of the weight portion 23 is large, the resonant frequency of the protrusion portions 21 tends to be shifted to a low frequency.

The shape of the weight portion 23 is not particularly limited, and is preferably a plate shape in terms of adjustment of sound-insulating performance, and thinning. When the weight portion 23 has a plate shape, the gravity center of the weight portion 23 can be apart from the sheet portion 11 as compared with the case where the weight portion 23 is a sphere or the like, and there is a tendency to increase the vibration moment of each of the protrusion portions 21. For example, when the vibration moment of the protrusion portions 21 is constant, the weight portion 23, which has a plate shape, can be thinned as compared with the case where the weight portion 23 is a sphere or the like. On the other hand, when the height of the weight portion 23 is constant, the weight, which has a plate shape, can provide a large vibration moment as compared with the case where the weight portion 23 is a sphere or the like.

The weight portion 23 may contain a through-hole, and examples of its shape include a doughnut shape, a washer shape, and a nut shape.

The material constituting the weight portion 23 may be appropriately selected in consideration of the mass, the cost, and the like, and the type thereof is not particularly limited. The material constituting the weight portion 23 is preferably a material high in specific gravity from the viewpoint of miniaturization of the sound-insulating sheet member 101, and an enhancement in sound-insulating performance.

Specific examples of the material of the weight portion 23 include a metal or an alloy, such as aluminum, stainless steel, iron, tungsten, gold, silver, copper, lead, zinc, or brass; inorganic glass such as soda glass, quartz glass, or lead glass; or a composite including a powder of such a metal or alloy, or such inorganic glass, in the resin material of the protrusion-formed portions 22, but not limited thereto. The material, the mass, and the specific gravity of the weight portion 23 may be determined so that the resonant frequency of the protrusion portions 21 is fitted with a desired sound insulation frequency region.

In particular, at least one selected from the group consisting of a metal, an alloy, and inorganic glass is preferable from the viewpoint of being low in cost and high in specific gravity. The specific gravity here means the ratio between the mass of the material and the mass of pure water having the same volume as that of the material, at 4° C. under a pressure of 1013.25 hPa, and a value obtained by measurement according to JIS K 0061 "Test methods for density and specific gravity of chemical products" is herein adopted.

The weight portion 23 may be subjected to surface treatment in order to enhance process suitability and member strength.

For example, application of chemical treatment with a solvent or the like for an increase in adhesiveness to the protrusion-formed portions 22 or application of physical treatment for an increase in member strength by depression/protrusion provided on a surface is considered, and the method of the surface treatment is not particularly limited.

The volume ratio of the weight portion 23 in the protrusion portions 21 is usually 1% by volume or more, preferably 5% by volume or more, more preferably 10% by volume or more, further preferably 20% by volume or more, and usually 90% by volume or less, preferably 80% by volume or less, more preferably 70% by volume or less, further preferably 50% by volume or less, based on 100% by volume of the protrusion portions, from the viewpoint of an enhancement in sound-insulating performance.

While the weight portion 23 is embedded in the protrusion-formed portions 22 at the tip of the protrusion portions 21 illustrated in FIG. 8, the position thereof disposed is not particularly limited thereto. While depending on the shapes, masses, elastic moduli, or the like of the protrusion-formed portions 22 and the weight portion 23, the protrusion-formed portions 22 and the weight portion 23 are preferably placed so that the gravity center (mass center) of the protrusion portions 21 is at least located at the tip against the center in the height direction of the protrusion portions 21 from the viewpoint of a reduction in thickness, a reduction in weight or an enhancement in sound-insulating performance of the sound-insulating sheet member 101. Typically, the weight portion 23 may be placed offset at the tip against the center in the height direction of the protrusion portions 21.

The weight portion 23 may be completely embedded in the protrusion-formed portions 22 (each of the protrusion portions 21), or may be at least partially embedded, or may be provided on the protrusion-formed portions 22 without being embedded in the protrusion-formed portions 22. The weight portion 23 is preferably at least partially embedded or more preferably completely embedded in the protrusion-formed portions 22 (each of the protrusion portions 21) from the viewpoint of suppression of dropping of the weight portion.

Such weight portions 23, when plurally contained in the sound-insulating sheet member, may be the same or different in terms of shape and height thereof.

Figure 10:
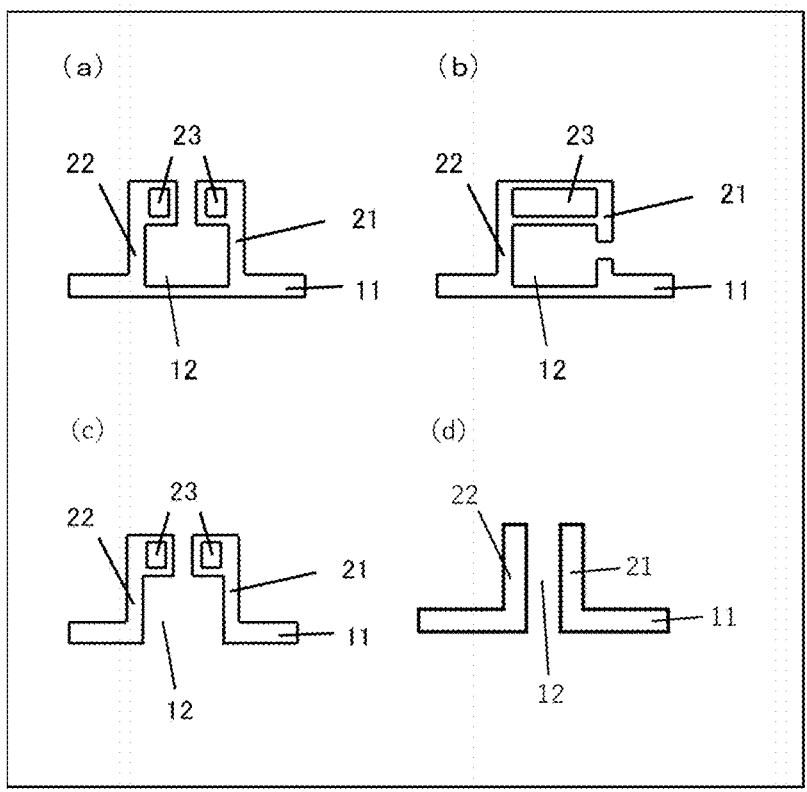
FIG. 10 is a cross-section view of a sound-insulating sheet member, the schematic diagram illustrating one aspect of a space portion.

In the sound-insulating sheet member according to the second embodiment, when the protrusion portions 21 contain the space portion 12, a part of the space portion 12 may be provided so as to reach at least any face of the tip and the side face of the protrusion portions 21, as illustrated in Panel (a) of FIG. 10 and Panel (b) of FIG. 10. Such a configuration is preferred because the influence of air inside, on the resonance of the protrusion portions 21, is smaller than that of the case where air is sealed inside.

As illustrated in Panel (c) of FIG. 10 and Panel (d) of FIG. 10, the protrusion portions 21 may contain a through-hole at both the tip and the sheet. In the case of a through-hole where the cross-section area of a cross section of the space portion 12 in the planar direction of the sheet portion is constant toward the sheet from the tip of the protrusion portions 21 as in Panel (d) of FIG. 10, the tip of the protrusion portions 21 may be difficult to weigh. Thus, when a through-hole is contained in the sheet, it is preferable to place a weight as in Panel (c) of FIG. 10, or not to contain a through-hole between the space portion 12 and an external, at the protrusion portions 21, as in Panel (e) of FIG. 3, or to thicken a wall of the tip of the protrusion portions 21 as in Panel (d) of FIG. 10.

While the spring-mass model expressed by a resonator with the spring portion as a unit is a model of a longitudinal expansion/contraction vibration mode, a model of a trampoline vibration mode will be described below.

When the shape of the protrusion portions 21 containing the space portion 12 satisfies a specified condition, the "trampoline vibration" as a preferable vibration mode can allow a further reduction in resonant frequency of the protrusion portions 21 or a further reduction in height of the protrusion portions 21 to be achieved.

Figure 11:
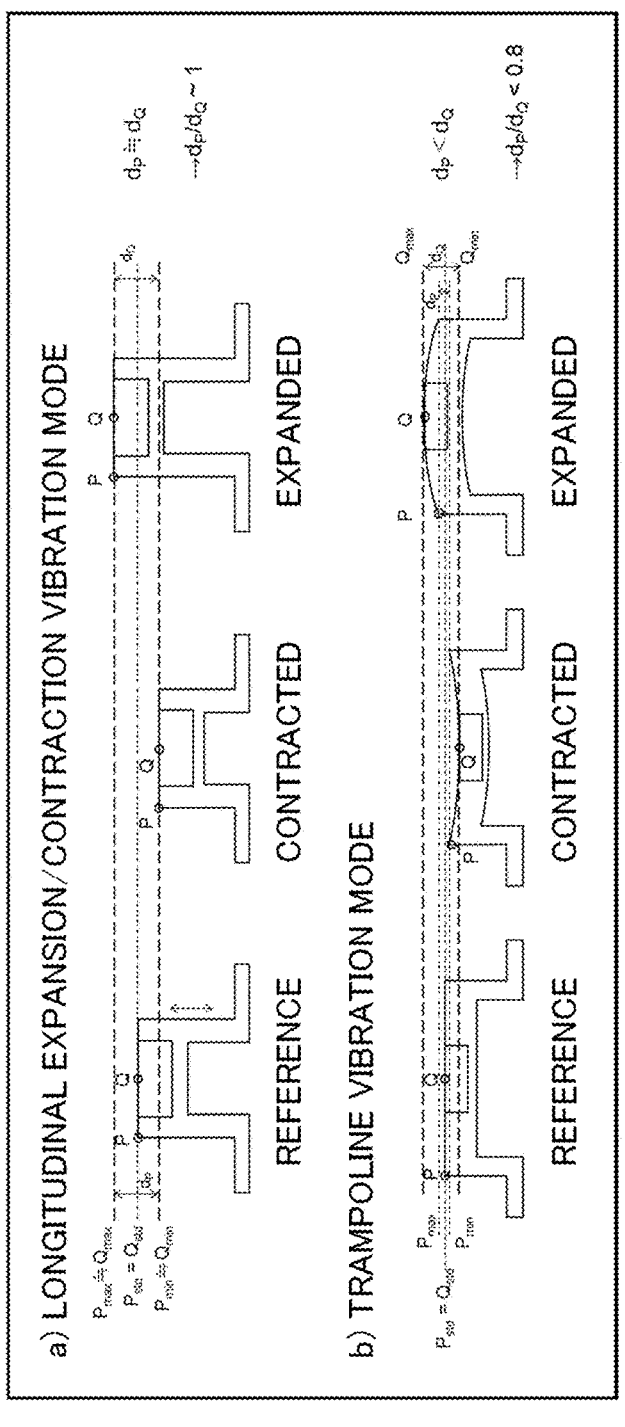
FIG. 11 is a diagram describing a longitudinal expansion/contraction vibration mode and a trampoline vibration mode.

The longitudinal expansion/contraction vibration herein refers to a mode where the outer periphery P of the tip of the protrusion portions 21 and the central portion Q of the tip of the protrusion portions 21 equally vibrate up and down as illustrated in Panel (a) of FIG. 11.

The trampoline vibration herein refers to a mode where the central portion Q of the tip of the protrusion portions 21 vibrates up and down as compared with the outer periphery P of the tip of the protrusion portions 21 as illustrated in Panel (b) of FIG. 11.

A vibration mode where, when the displacement field Z component on the outer periphery P of the tip of the protrusion portions 21 is designated as $d_P$ and the displacement field Z component on the central portion Q of the tip of the protrusion portions 21 is designated as $d_Q$ in a certain vibration mode as illustrated in FIG. 11, $d_P/d_Q<0.8$, more preferably $d_P/d_Q<0.5$ is satisfied is herein defined as a trampoline vibration mode.

When trampoline vibration occurs, the resonant frequency can be reduced at the same height of the protrusion portions 21 as compared with the case where longitudinal expansion/contraction vibration occurs, and a height of the protrusion portions 21, leading to the same resonant frequency, can be reduced (reduction in height). The effects are similar and will be described in detail.

Figure 12:
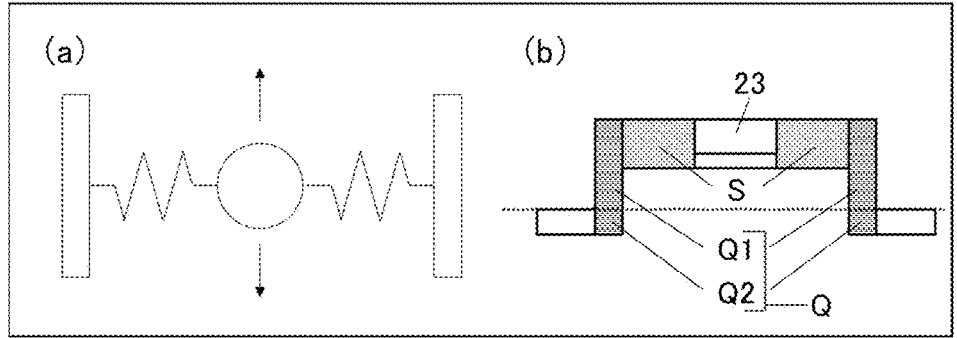
FIG. 12 is a diagram illustrating a simple model indicating an operating principle of the sound-insulating structure body according to the present embodiment.

The present feature can be noted with a spring-mass model where the protrusion portions 21 are expressed by a resonator with a spring portion illustrated in Panel (a) of FIG. 12, as a unit. An arrow in Panel (a) of FIG. 12 indicates a resonant direction. When the protrusion portions 21 contain the weight portion 23, in Panels (a) and (b) of FIG. 12, a circle sign corresponds to the weight portion 23 at the tip against the space portion 12 of the protrusion portions 21, a spring sign corresponds to a part S (spring portion S) of the protrusion-formed portions 22 at the tip against the space portion 12 of the protrusion portions 21, in which the part is not overlapped with the weight portion 23, but overlapped with the space portion 12, in a planar view of the sound-insulating sheet member, and a quadrangular sign corresponds to a portion Q (quadrangular portion Q) of the protrusion-formed portions 22, the portion including a portion Q1 not overlapped with the space portion 12 in a planar view of the sound-insulating sheet member, and a portion Q2 of the sheet portion 11, overlapped with Q1, in a planar view of the sound-insulating sheet member.

When the mass of the weight portion 23 at the tip against the space portion 12 of the protrusion portions 21 is designated as M and the spring rate of the spring portion S is designated as K, the resonant frequency of the protrusion portions 21 can be designated as $f \propto (K/M)^{1/2}$, and the resonant frequency f of the protrusion portions 21 is found to be proportional to the one-half power of the spring rate K.

Figure 13:
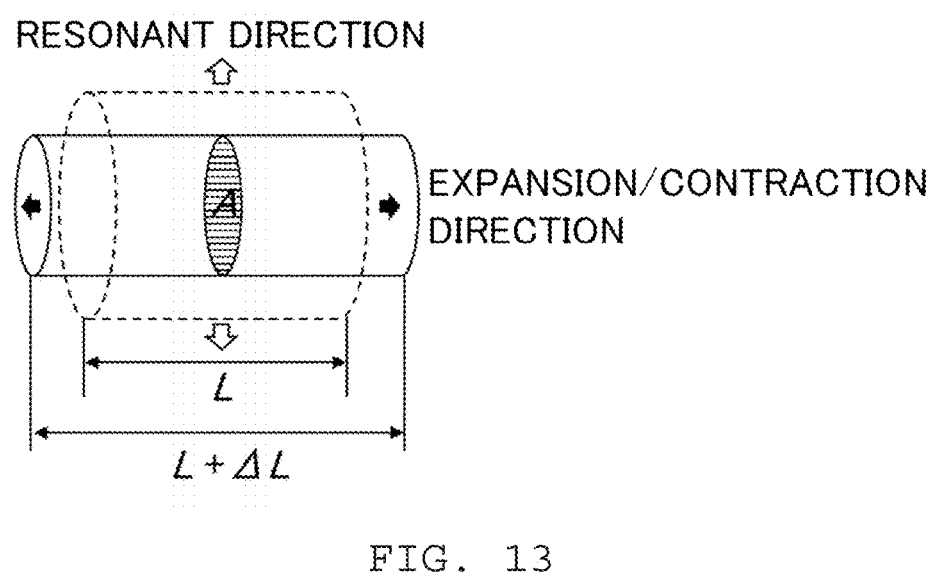

In order to reveal a corresponding relationship between the spring-mass model, and the shape of the protrusion portions and material properties, the description will be made with reference to a model illustrated in FIG. 13. First, a rod-like spring is assumed where the shape of a part including a protrusion-formed portion at the tip against the space portion 12 of the protrusion portions 21, and the weight portion 23 is assumed to be a shape not containing any space portion such as a cylinder or a prism, and the cross-section area of a cross section of this protrusion-formed portion in the planar direction of the sheet portion has a certain shape. In this case, a relationship between a weight F of the rod-like spring and a height L of the spring portion (elongation of spring portion) is expressed by the following expression. In FIG. 13, a white arrow indicates a resonant direction and a black arrow indicates an expansion/contraction direction.

$$\Delta F = (EA\Delta L/L)$$

E (MPa): storage modulus of spring portion S

A ($mm^2$): cross-section area of cross section perpendicular to expansion/contraction direction, of part including weight portion 23 at tip against space portion 12 of protrusion portions 21, and protrusion-formed portions 22 at tip against space portion 12 of protrusion portions 21

L (mm): length of spring portion S in expansion/contraction direction $\Delta L$ (mm): elongation of spring portion S in expansion/contraction direction in application of weight F In the expression, the spring rate K is expressed by K=EA/L from the relationship of $\Delta F/\Delta L=K$. Accordingly, it is found that the spring rate K is in reverse proportion to the length L of the spring portion S in the expansion/contraction direction. Since an increase in diameter of a cross section of the protrusion portions 21 in the planar direction of the sheet portion results in an increase in length L of the spring portion S in the expansion/contraction direction, the resonant frequency f of the protrusion portions 21 can be reduced. This tendency in the trampoline vibration mode is a reverse tendency to that of the model of the longitudinal expansion/contraction vibration mode. The reason for this is because, when the diameter of a cross section of the protrusion portions 21 in a planar direction of the sheet portion is increased in the model of the longitudinal expansion/contraction vibration mode, the cross-section area A of the protrusion portions 21 is increased and thus K is increased according to the relationship of K=EA/L and the resonant frequency f of the protrusion portions 21 is shifted to a high frequency.

While the longitudinal expansion/contraction vibration mode requires an increase in height of the protrusion portions 21 in order to allow a reduction in frequency to be achieved by the changes in outer diameter and shape of the protrusion portions 21, the trampoline vibration mode can allow a reduction in frequency to be achieved by an increase in diameter of a cross section of the protrusion portions 21 in the planar direction of the sheet portion without any change in height of the protrusion portions 21, and therefore can allow the same frequency to be achieved even in the case of a lower height of the protrusion portions 21 than that of the longitudinal expansion/contraction vibration mode and, as a result, can allow a reduction in height of the protrusion portions 21 to be achieved.

The structure of the protrusion portions 21, which easily results in the occurrence of the trampoline vibration mode ($d_P/d_Q$<0.8), is a structure satisfying the following (1) or (2), and the structure, which more easily results in the above occurrence, is a structure satisfying both the following (1) and (2).

(1) The ratio ($D_P/D_W$) of the equivalent diameter $D_P$ of the protrusion portions, represented by the following expression, to the equivalent diameter $D_W$ of the weight portion, represented by the following expression, is 1.25 or more.

(2) The ratio ($H/D_P$) of the height (the total value of the height of the protrusion portions in a direction perpendicular to the planar direction of the sheet portion and the thickness of the sheet portion) H of the composite region to the equivalent diameter $D_P$ of the protrusion portions, represented by the following expression, is 2.1 or less (more preferably, 0.91 or less).

$$D_P = 4A_P/p_P$$

$$D_W = 4A_W/p_W$$

$D_P$: the equivalent diameter of the protrusion portions
$D_W$: the equivalent diameter of the weight portion
$A_P$: the area of a region formed from the outer perimeter of a cross section of the protrusion portions in the planar direction of the sheet portion
$A_W$: the area of a region formed from the outer perimeter of a cross section of the weight portion in the planar direction of the sheet portion
$p_P$: the length of the outer perimeter of a cross section of the protrusion portions in the planar direction of the sheet portion
$p_W$: the length of the outer perimeter of a cross section of the weight portion in the planar direction of the sheet portion.

If the outer diameter of the protrusion portions 21 is a value close to the outer diameter of the weight portion 23, only the weight portion 23 placed at the tip of the protrusion portions 21 cannot vibrate and the vibration mode does not correspond to the trampoline vibration mode. If the height of the protrusion portions 21 is higher relative to the outer diameter of the protrusion portions 21, only the weight portion 23 placed at the tip of the protrusion portions 21 cannot vibrate again and the vibration mode does not correspond to the trampoline vibration mode.

<Sound-Insulating Structure Body>

A sound-insulating structure body according to another embodiment of the present invention (also simply referred to as "sound-insulating structure body".) is a sound-insulating structure body including at least the sound-insulating sheet member according to each of the embodiments, and a support supporting the sound-insulating sheet member.

The sound-insulating sheet member can be appropriately disposed depending on the environment where sound-insulating performance is to be exhibited. For example, the sound-insulating sheet member may be directly disposed on an apparatus, a structure body, or the like. An adhesion layer or the like may also be provided between the sound-insulating sheet member and such an apparatus, a structure body, or the like. On the other hand, the support that supports the sound-insulating sheet member may be used together to provide a sound-insulating structure body as in the present embodiment. The support is required to support the sound-insulating sheet member in sound insulation with the sound-insulating sheet member, and is not required to support the sound-insulating sheet member at the stage of production, storage, or the like.

Figure 14:
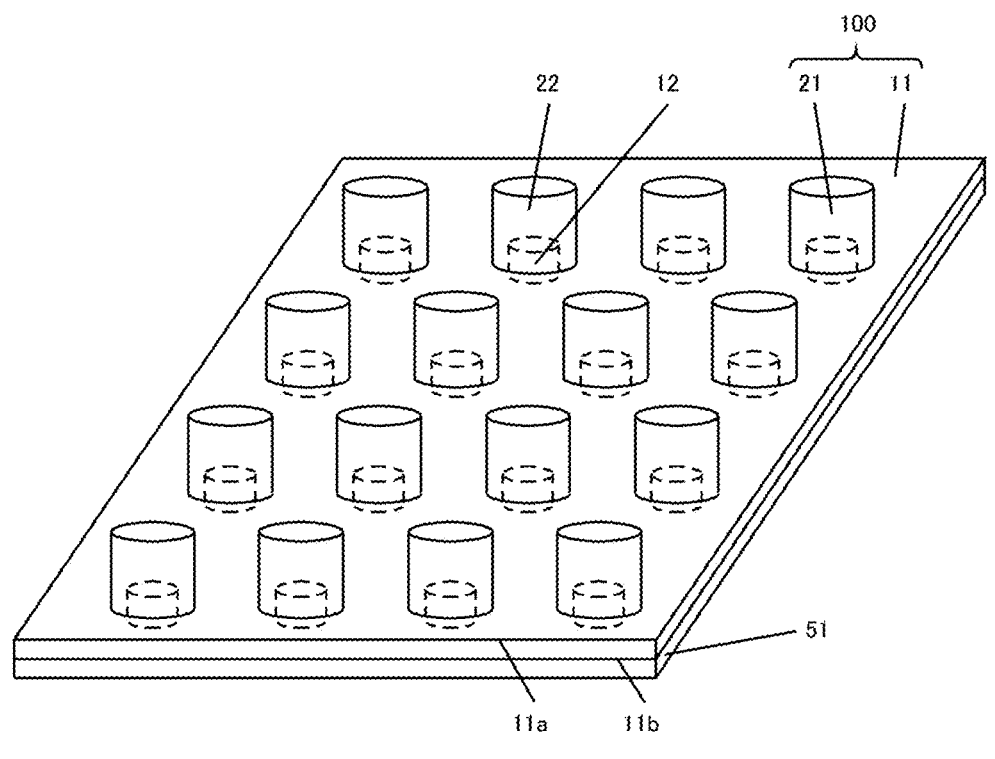
FIG. 14 is a schematic perspective view illustrating a sound-insulating structure body including the sound-insulating sheet member according to the first embodiment.
Figure 15:
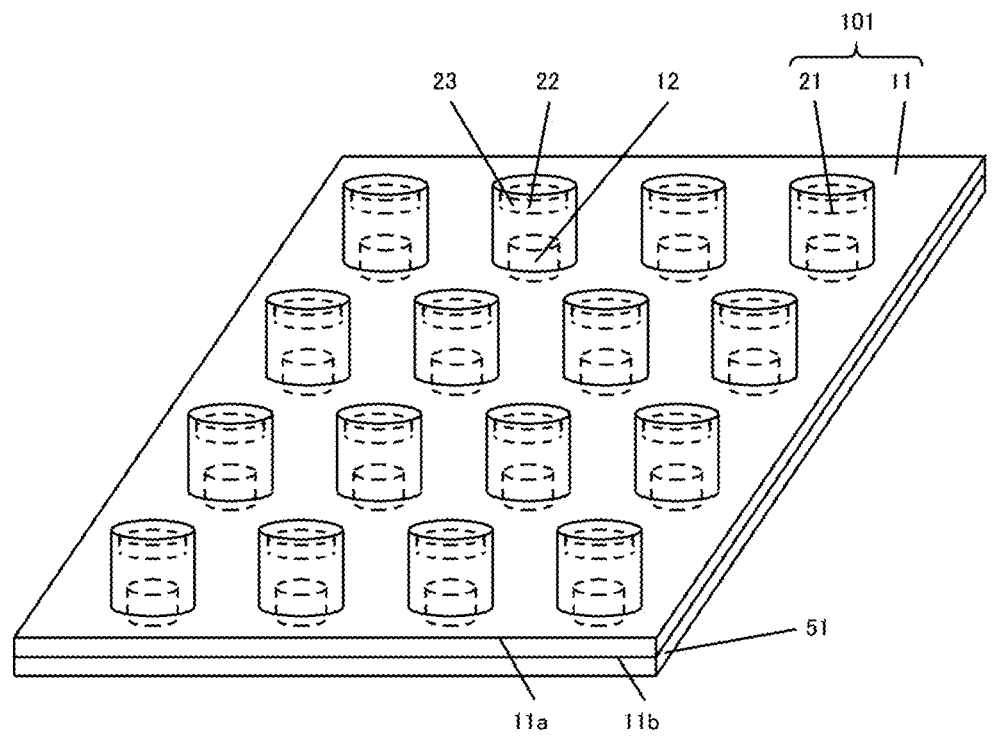
FIG. 15 is a schematic perspective view illustrating a sound-insulating structure body including the sound-insulating sheet member according to the second embodiment.

One example of the sound-insulating structure body is illustrated in FIG. 14 and FIG. 15. FIG. 14 illustrates a sound-insulating structure body 200 including the sound-insulating sheet member 100 according to the first embodiment, and a support 51 that supports the sound-insulating sheet member 100, and FIG. 15 illustrates a sound-insulating structure body 201 including the sound-insulating sheet member 101 according to the second embodiment, and a support 51 that supports the sound-insulating sheet member 101.

[Support]

Figure 16:
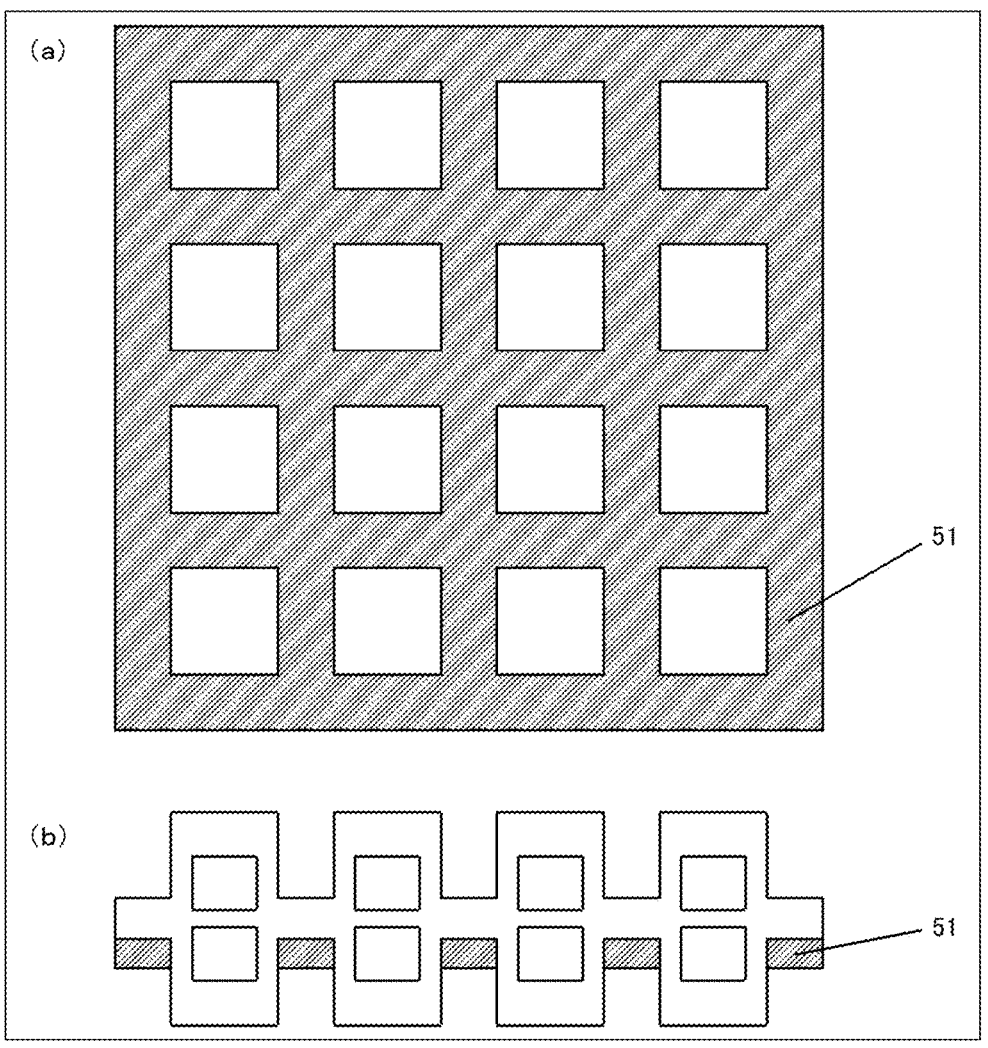
FIG. 16 is a cross-section view of one example of a support, and a sound-insulating structure body including the support and the sound-insulating sheet member.

The support is not especially restricted as long as it is provided on the sound-insulating sheet member, and is preferably provided in contact with a face of the sound-insulating sheet member where the protrusion portions are provided on only one face of the sheet member, the face being opposite to a face where the protrusion portions are provided, from the viewpoint of ease of production and structural stability. When the protrusion portions are formed on both faces of the sheet portion, a perforated support may be used and may be provided on a sheet face provided in contact with the protrusion portions, as illustrated in Panel (a) of FIG. 16. The support illustrated in Panel (a) of FIG. 16 may be provided on a face where the protrusion portions are provided, in an aspect where the protrusion portions are provided on only one face of the sheet portion. A cross-section view of such a sound-insulating sheet member including the support illustrated in Panel (a) of FIG. 16 is illustrated in Panel (b) of FIG. 16.

The material constituting the support is not particularly limited as long as it can support the sound-insulating sheet member, and is preferably one higher in rigidity than the material constituting the sheet portion or the protrusion portions from the viewpoint of an enhancement in sound-insulating performance. Specifically, the support 51 preferably has a Young's modulus of 1 GPa or more, more preferably 1.5 GPa or more, and the upper limit is not particularly set and may be, for example, 1000 GPa or less.

When the sound-insulating sheet member is directly disposed on an apparatus, a structure body, or the like, a face on which the sound-insulating sheet member is to be disposed preferably has rigidity comparable with that of the above support, for example, from the viewpoint of supporting of the sheet and from the viewpoint of an enhancement in sound-insulating performance.

Examples of the material constituting the support include a photo-curable resin sheet, a thermosetting resin sheet, a thermoplastic resin sheet, a metal plate, and an alloy plate. Examples of the photo-curable resin sheet, the thermosetting resin sheet and the thermoplastic resin sheet include sheets with the photo-curable resin, the thermosetting resin and the thermoplastic resin exemplified with respect to the sheet portion 11.

Specific examples of the material constituting the support include an organic material, for example, a polyester resin such as polyethylene terephthalate, polybutylene terephthalate, polyethylene naphthalate, or polybutylene succinate, a poly(meth)acrylate resin such as polymethyl methacrylate, a polycarbonate resin mainly containing isosorbide, such as polycarbonate, a polyolefin resin such as polyethylene, polypropylene, or polynorbornene, a vinyl chloride resin, polyacrylonitrile, polyvinylidene chloride, polyethersulfone, polyphenylene sulfide, polyarylate, polyamide, polyimide, triacetylcellulose, polystyrene, an epoxy resin, or an oxazine resin, or a composite material containing in such an organic material, a metal such as aluminum, stainless steel, iron, copper, zinc, or brass, inorganic glass, or an inorganic particle or fiber.

In particular, the support is preferably at least one selected from the group consisting of a photo-curable resin sheet, a thermosetting resin sheet, a thermoplastic resin sheet, a metal plate and an alloy plate from the viewpoint of sound-insulating properties, rigidity, moldability, cost, and the like. The thickness of the support is not particularly limited, and is usually preferably 0.05 mm or more and 0.5 mm or less from the viewpoint of sound-insulating performance, rigidity, moldability, weight saving, cost, and the like.

Furthermore, a coating layer may be provided on a surface of the support from the viewpoint light permeability, adhesiveness to the sound-insulating sheet member, and the like.

The shape of the support can be appropriately set depending on a face on which the sound-insulating structure body is to be disposed, and is not particularly limited. For example, the shape may be a flat sheet-like shape, a curved sheet-like shape, or a special shape which is processed so as to have a curve portion, a folded portion, or the like. Furthermore, a notched or punched portion may be provided on any site of the support from the viewpoint of weight saving or the like.

The areal density (mass per unit area) of the support can also be appropriately set depending on the desired performance, and is not particularly limited. The areal density of the support is preferably 80% or less, more preferably 30% or less, further preferably 10% or less relative to the areal density of the sound-insulating sheet member from the viewpoint that the effects of the present invention are enhanced, and the upper limit is not particularly set and may be, for example, 1% or more.

The sound-insulating structure body may be a stacked body including the sound-insulating sheet member of the present embodiment. For example, the sound-insulating sheet member may be provided on both faces of the support. A plurality of such sound-insulating structure bodies in which the sound-insulating sheet member is provided on the support may be stacked. A plurality of the sound-insulating sheet members may be combined to thereby control the frequency place or the like.

Even a stacked body where the sound-insulating sheet member is provided on both faces of the support can follow a non-flat face having a curve or the like as long as a housing or the like including the support and the stacked body is flexible, and thus the sound-insulating structure body can also be stably mounted.

<Methods for Producing Sound-Insulating Sheet Member and Sound-Insulating Structure Body>

The methods for producing the sound-insulating sheet member and the sound-insulating structure body of the present invention are not particularly limited. Examples include the following Production Methods 1 to 4.

The shape of each cavity used in such Production Methods is not particularly limited, and the shape of the bottom thereof can be appropriately selected from, for example, a semi-spherical, planar, protruded, or depressed shape.

(Production Method 1)

Production Method 1 may include the following Steps (1) to (3).

Step (1) of preparing a mold containing a plurality of cavities, and pouring a resin material into the cavities.

Step (2) of curing the resin material poured.

Step (3) of releasing the resulting cured product from the mold to thereby obtain the sound-insulating sheet member.

Production Method 1 may include a step of providing a support on the resulting cured product to thereby obtain the sound-insulating structure body, after Step (2) or (3).

(Production Method 2)

Production Method 2 may include the following Steps (4) to (7).

Step (4) of preparing a mold containing a plurality of cavities, and placing a weight on the plurality of cavities provided on the mold.

Step (5) of pouring a resin material into the cavities.

Step (6) of curing the resin material poured.

Step (7) of releasing the resulting cured product from the mold to thereby obtain the sound-insulating sheet member.

Production Method 2 may include a step of providing a support on the resulting cured product to thereby obtain the sound-insulating structure body, after Step (6) or (7).

(Production Method 3)

Production Method 3 may include the following Steps (8) to (12).

Step (8) of applying a photo-curable elastomer precursor or a photo-curable resin precursor to a mold containing a plurality of cavities.

Step (9) of stacking a substrate on the elastomer precursor or resin precursor flattened on the mold.

Step (10) of pushing the stacked body of a support and the mold at the substrate by a pressure roll, to thereby pack the elastomer precursor or resin precursor into the cavities.

Step (11) of radiating light at the substrate, to thereby not only cure the elastomer precursor or resin precursor to which the cavity shape of the mold is transferred, but also bonding the cured product of the elastomer precursor or resin precursor and the substrate by polymerization.

Step (12) of releasing the cured product of the elastomer precursor or resin precursor and the substrate which are bonded in (11), from the mold, to thereby obtain the sound-insulating sheet member and the sound-insulating structure body.

(Production Method 4)

Production Method 4 may include the following Steps (13) to (15).

Step (13) of, with rotating a roller mold having an outer periphery face where a plurality of cavities is arranged and driving a substrate in a rotation direction of the roller mold along with the outer periphery face of the roller mold, applying a photo-curable elastomer precursor or a photo-curable resin precursor onto the outer periphery face of the roller mold, to thereby pack the elastomer precursor or resin precursor into the cavities.

Step (14) of irradiating a region between the outer periphery face of the roller mold and the substrate with light in the state of the elastomer precursor or resin precursor being sandwiched between the outer periphery face of the roller mold and the substrate. Step (15) of releasing a product obtained in Step (14), where the cured product of the elastomer precursor or resin precursor and the substrate are bonded, from the roller mold to thereby obtain the sound-insulating sheet member and the sound-insulating structure body.

The sound-insulating sheet member, which contains protrusion portions and a sheet, can be formed in Steps (10) and (11) of Production Method 3 or in Steps (13) and (14) of Production Method 4.

The substrate used in each of Production Methods 3 and 4 is not particularly limited. The sound-insulating sheet member formed on the substrate may be used as it is, or the sheet member, from which the substrate is released, may be used.

A step of further providing a support may be included after Step (11) or (12) in Production Method 3 or after Step (14) or (15) in Production Method 4. The substrate may be such a support.

Steps (10) and (11) in Production Method 3, and Steps (13) and (14) in Production Method 4 may be each provided multiple times. For example, Steps (13), (14), (13), (14), and (15) may be performed in the listed order in Production Method 4.

In the case where such Steps are provided multiple times, photo-curable elastomer precursors or photo-curable resin precursors here used may be different. For example, photo-curable elastomer precursors or photo-curable resin precursors respectively used in the first Step (13) and the second Step (13) in Production Method 4 may be different. A metal powder or the like may be mixed in the photo-curable elastomer precursor or the photo-curable resin precursor in the second Step so that a cured product (protrusion portion) obtained in Step (15) includes a protrusion-formed portion and a weight portion.

A method involving subjecting the sound-insulating sheet member to integral molding by mold molding, cast molding, or the like is preferable from the viewpoint of enhancements in productivity and economic performance. Examples thereof include a method of forming an integrated molded product of a sheet portion, protrusion portions and a space portion with a mold or a cast having a cavity shape corresponding to such an integrated molded product of a sheet portion, protrusion portions and a space portion. Various known methods such as a press molding method, a compression molding method, a cast molding method, an extrusion method, and an injection molding method are known as such integral molding methods, and the types thereof are not particularly limited. A raw material for each component can be poured as a liquid precursor or a thermally molten body into the cavities as long as it is, for example, a resin material having rubber elasticity. Such a raw material, if a metal, an alloy, or inorganic glass, can be placed (inserted) to a predetermined location in the cavities in advance and formed into an insert molded body.

The resin material is not particularly limited. Examples thereof include the materials, and any raw material or intermediate thereof and the like exemplified with respect to the sheet and the protrusion-formed portions as the sound-insulating sheet member of the present invention.

Figure 17:
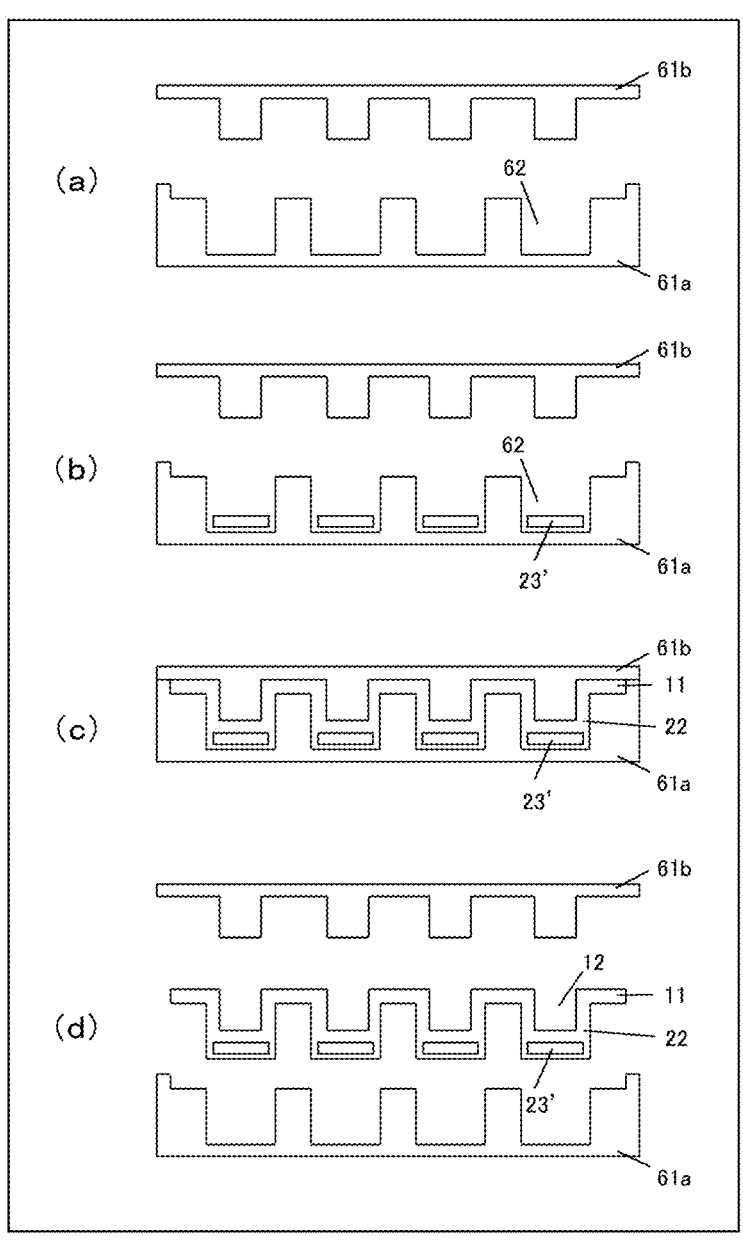
FIG. 17 is a diagram illustrating one example of a production process of the sound-insulating sheet member.

FIG. 17 is a diagram illustrating one example of a production process of the sound-insulating sheet member. Here, molds 61a and 61b containing cavities 62 of a shape corresponding to the above-mentioned protrusion portions and space portion, and a mold 61b are used (see Panel (a) of FIG. 17), a weight 23' is placed on the cavities 62 of the mold 61a (see Panel (b) of FIG. 17), thereafter a resin material having rubber elasticity is poured into the cavities 62 and, if necessary, heated or pressurized (see Panel (c) of FIG. 17), and thereafter an integrated molded product of a sheet portion and protrusion portions is released to obtain the sound-insulating sheet member (see Panel (d) of FIG. 17). While the resin material is poured after placing of the weight 23' in this example, the weight 23' may be placed after pouring of the resin material. The configuration of the weight portion 23 can be applied to the configuration of the weight 23'. Such an integral molding method not only enhances productivity and economic performance, but also tends to easily provide a sound-insulating sheet member that can be easily formed even in a complicated shape and that is enhanced in adhesion force of each component and excellent in mechanical strength. The sheet portion or the protrusion portions, preferably, the sound-insulating sheet portion is preferably a thermosetting elastomer or thermoplastic elastomer-containing integrated molded product (integrated molded article), from the above viewpoints.

[Usage of Sound-Insulating Sheet Member and Sound-Insulating Structure Body]

One example of usage methods of the sound-insulating sheet member and the sound-insulating structure body is considered to be a usage method of installation to the interior or exterior of small electronic equipment, for use in the sound deadening or sound suppressing of motor sound of small electronic equipment or the like, or switching sound in an electronic circuit.

EXAMPLES

Hereinafter, the present invention will be more specifically described with reference to Examples, but the present invention is not limited thereto at all. Various conditions can be adopted in the present invention as long as such conditions do not depart from the gist of the present invention and the objects of the present invention are achieved.

Experiment 1

[Calculation of Natural Frequency]

The natural frequency of a structure was calculated with COMSOL Multiphysics (COMSOL, Inc.) as physical simulation software using a finite element method in Examples described below. Conditions of the physical simulation will be described in detail.

Figure 18:
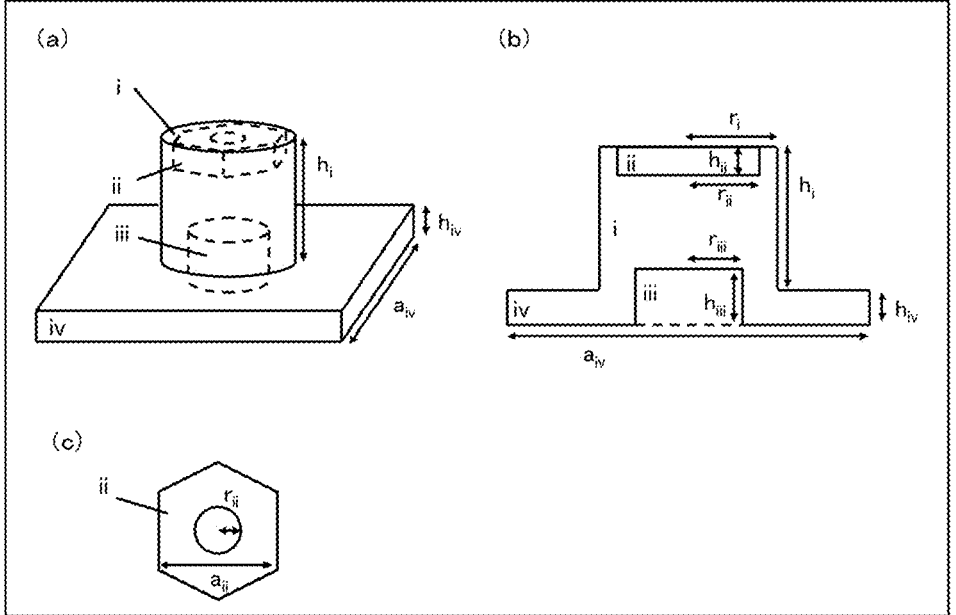
FIG. 18 is a schematic configuration diagram of a unit cell used for the calculation of the resonant frequency.
Figure 19:
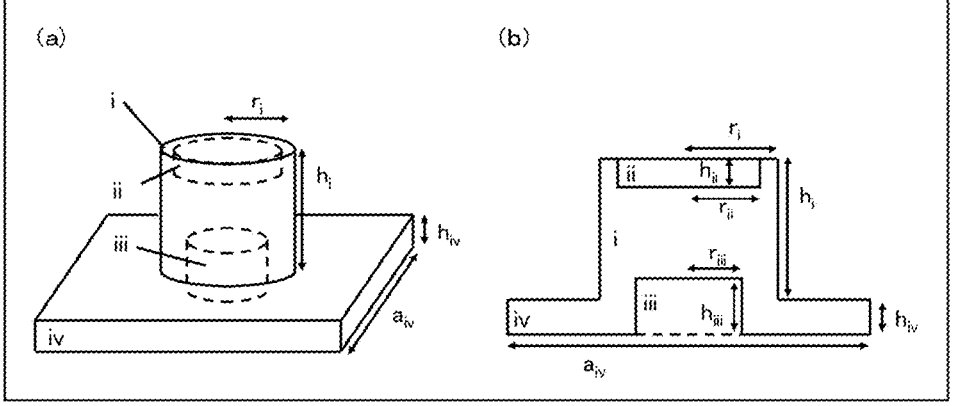
FIG. 19 is a schematic configuration diagram of a unit cell used for the calculation of the resonant frequency.
Figure 20:
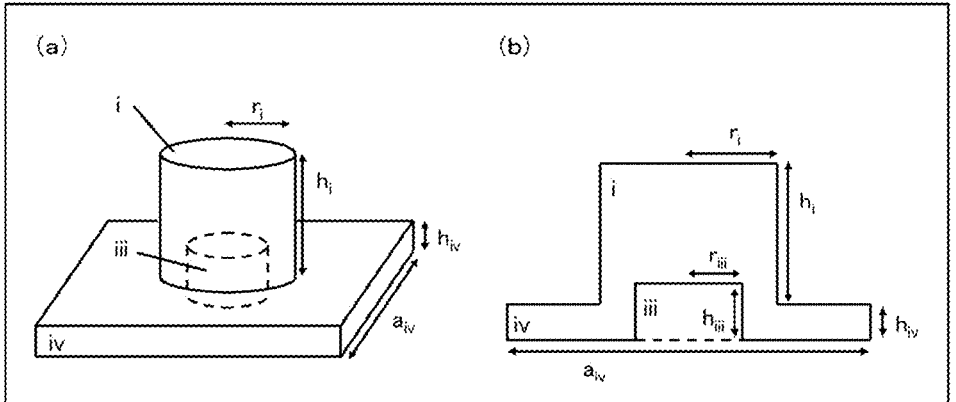
FIG. 20 is a schematic configuration diagram of a unit cell used for the calculation of the resonant frequency.
Figure 21:
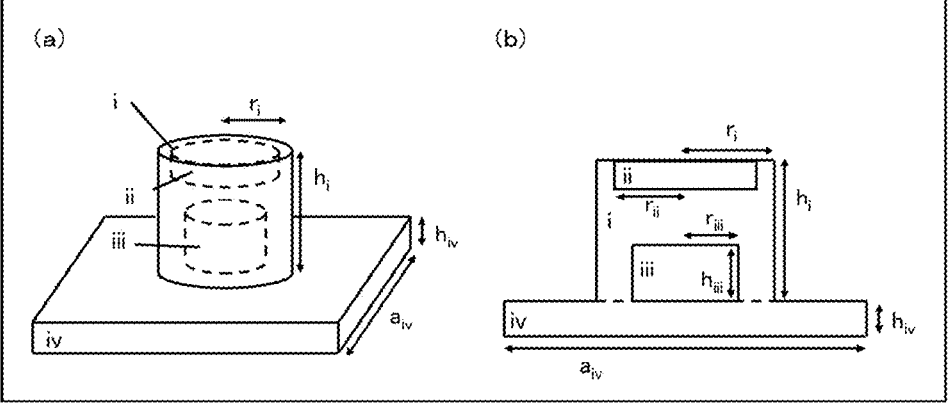
FIG. 21 is a schematic configuration diagram of a unit cell used for the calculation of the resonant frequency.

A finite element method was used in the physical simulation. A finite element method is a numerical analysis technique for approximately solving an analytically insoluble differential equation at a high accuracy, and is a method for approximately calculating the entire behavior by dividing a complicated subject to be analyzed, into simple small parts (elements). The natural frequency of protrusion in Examples described below was calculated according to the following procedure. The natural vibration mode was calculated in a condition where the bottom face of a sheet portion iv was completely fixed, by assigning physical properties (specific gravity, storage modulus (Young's modulus), Poisson's ratio) described in Tables 1 to 4, and material dimensions (r, h, a) described in Tables 1 to 4 and FIGS. 18 to 21, with respect to each of Moieties i to iv of each sound-insulating structure body in FIGS. 18 to 21, in the solid mechanics module equation of COMSOL Multiphysics (COMSOL, Inc.). FIG. 18 illustrates an aspect with a perforated nut (hexagonal plate) as a weight portion, FIG. 19 illustrates an aspect with a circular plate, FIG. 20 illustrates an aspect without any weight portion, and FIG. 21 illustrates an aspect with a circular plate as a weight portion, where a space portion is present in only protrusion portions. This calculation is conducted with assuming a case of no influence by any adhesive, as an ideal state, and thus is to calculate the natural frequency under a condition where the bottom face of Moiety iv is completely fixed.

The proportion of a cross section where the area proportion occupied by the space portion (Moiety iii) is maximum, in a cross section of protrusion portions in the horizontal direction, is defined as follows.

$$\text{Area proportion of space portion}[\%] = (\text{Radius of Moiety } iii)_2/(\text{Radius of Moiety } i)^2$$

<Aspect with Perforated Nut (Hexagonal Plate) as Weight Portion>

Examples 1 to 4

Examples 1 to 4 were each a unit cell including the sound-insulating sheet member illustrated in FIG. 18. The size, the material, and the physical properties of each constituent member of the unit cell were shown in Table 1. The natural frequency of longitudinal expansion/contraction vibration of protrusions in the unit cell was calculated based on the above calculation method, and the results were described in Table 1.

Comparative Examples 1 to 4

Comparative Examples 1 to 4 were also each a unit cell including the sound-insulating sheet member illustrated in FIG. 18. The size, the material, and the physical properties of each constituent member of the unit cell were shown in Table 1. The natural frequency of longitudinal expansion/contraction vibration of protrusions in the unit cell was calculated based on the above calculation method, and the results were described in Table 1.

TABLE 1

| | Weight shape | Moiety | r (mm) | h (mm) | a (mm) | Material | Specific gravity (g/cm³) | Young's modulus (MPa) | Poisson's ratio | Resonant frequency (Hz) | Area proportion of space portion [%] |
|---|---|---|---|---|---|---|---|---|---|---|---|
| Example 1 | Hexagonal plate | I | 4.5 | 9.5 | — | Rubber | 1.05 | 1.9 | 0.49 | 541 | 44% |
| | | Ii | 2 | 3.2 | 7 | Iron | 7.85 | 211000 | 0.29 | | |
| | | Iii | 3 | 6 | — | Air | — | — | — | | |
| | | iv | — | 0.5 | 11 | Rubber | 1.05 | 1.9 | 0.49 | | |
| Example 2 | Hexagonal plate | I | 10 | 9.5 | — | Rubber | 1.05 | 1.9 | 0.49 | 408 | 64% |
| | | Ii | 4 | 6.5 | 13 | Iron | 7.85 | 211000 | 0.29 | | |
| | | Iii | 8 | 3 | — | Air | — | — | — | | |
| | | iv | — | 0.5 | 22 | Rubber | 1.05 | 1.9 | 0.49 | | |
| Example 3 | Hexagonal plate | I | 4.5 | 15.5 | — | Rubber | 1.05 | 1.9 | 0.49 | 301 | 64% |
| | | Ii | 2 | 3.2 | 7 | Iron | 7.85 | 211000 | 0,29 | | |
| | | Iii | 3.6 | 12.3 | — | Air | — | — | — | | |
| | | iv | — | 0.5 | 11 | Rubber | 1.05 | 1.9 | 0.49 | | |
| Example 4 | Hexagonal plate | I | 8 | 29.5 | — | Rubber | 1.05 | 1.9 | 0.49 | 156 | 64% |
| | | Ii | 4 | 6.5 | 13 | Iron | 7.85 | 211000 | 0.29 | | |
| | | Iii | 6.4 | 23 | — | Air | — | — | — | | |
| | | iv | — | 0.5 | 18 | Rubber | 1.05 | 1.9 | 0.49 | | |
| Comparative Example 1 | Hexagonal plate | I | 4.5 | 9.5 | — | Rubber | 1.05 | 1.9 | 0.49 | 737 | — |
| | | Ii | 2 | 3.2 | 7 | Iron | 7.85 | 211000 | 0.29 | | |
| | | Iii | — | — | — | — | — | — | — | | |
| | | iv | — | 0.5 | 11 | Rubber | 1.05 | 1.9 | 0.49 | | |
| Comparative Example 2 | Hexagonal plate | I | 10 | 9.5 | — | Rubber | 1.05 | 1.9 | 0.49 | 1168 | — |
| | | Ii | 4 | 6.5 | 13 | Iron | 7.85 | 211000 | 0.29 | | |
| | | Iii | — | — | — | Air | — | — | — | | |
| | | iv | — | 0.5 | 22 | Rubber | 1.05 | 1.9 | 0.49 | | |
| Comparative Example 3 | Hexagonal plate | I | 4.5 | 27.5 | — | Rubber | 1.05 | 1.9 | 0.49 | 299 | — |
| | | Ii | 2 | 3.2 | 7 | Iron | 7.85 | 211000 | 0.29 | | |
| | | Iii | — | — | — | — | — | — | — | | |
| | | iv | — | 0.5 | 11 | Rubber | 1.05 | 1.9 | 0.49 | | |
| Comparative Example 4 | Hexagonal plate | I | 8 | 44.5 | — | Rubber | 1.05 | 1.9 | 0.49 | 177 | — |
| | | Ii | 4 | 6.5 | 13 | Iron | 7.85 | 211000 | 0.29 | | |
| | | Iii | — | — | — | — | — | — | — | | |
| | | iv | — | 0.5 | 18 | Rubber | 1.05 | 1.9 | 0.49 | | |

The amount of the normalized natural frequency shifted is defined as follows, in order to identify the magnification of the amount of the natural frequency shifted by the space portion (Moiety iii).

$$\text{Amount of frequency shifted}[\%] = ((\text{Natural frequency in aspect without Moiety } iii) - (\text{Natural frequency}))/(\text{Natural frequency in aspect without Moiety } iii)$$

Examples 1 and 2 and Comparative Examples 1 and 2, which were the same in terms of the outer shape of the unit cell, were compared by the presence or absence of Moiety iii. Example 1 and Comparative Example 1, although were the same in terms of the protrusion portion dimensions, respectively exhibited resonant frequencies of 541 Hz and 737 Hz, and it was confirmed that the natural frequency of longitudinal expansion/contraction vibration was considerably reduced by Moiety iii. When Example 2 and Comparative Example 2 were similarly compared, Example 2 and Comparative Example 2 respectively exhibited resonant frequencies of 408 Hz and 1168 Hz, and it was confirmed that the natural frequency of longitudinal expansion/contraction vibration was considerably reduced by Moiety iii.

Examples 3 and 4 and Comparative Examples 3 and 4, which were adjusted about the protrusion portion height so as to be the same in terms of the natural frequency of longitudinal expansion/contraction vibration, were compared about protrusion portions having the same diameter. Example 3 and Comparative Example 3, which were the same in terms of the natural frequency of longitudinal expansion/contraction vibration, respectively exhibited protrusion portion heights of 15.5 mm and 27.5 mm, and it was

Comparative Examples 5 to 6

Comparative Examples 5 to 6 were also each a unit cell including the sound-insulating sheet member illustrated in FIG. 19. The size, the material, and the physical properties of each constituent member of the unit cell were shown in Table 2. The natural frequency of longitudinal expansion/contraction vibration of protrusions in the unit cell was calculated based on the above calculation method, and the results were described in Table 2.

Examples 5 to 9 and Comparative Examples 5 and 6, which were the same in terms of the outer shape of the unit cell, were compared by the difference in r of Moiety iii. Comparative Example 5 was an aspect without Moiety iii (r of Moiety iii: 0).

TABLE 2

| | Weight shape | Moiety | r (mm) | h (mm) | a (mm) | Material | Specific gravity (g/cm³) | Young's Modulus (MPa) | Poisson's ratio | Resonant frequency (Hz) | Area proportion of space portion [%] | Amount of frequency shifted [%] |
|---|---|---|---|---|---|---|---|---|---|---|---|---|
| Example 5 | Circular plate | I | 4.5 | 9.5 | — | Rubber | 1.05 | 1.9 | 0.49 | 574 | 25% | 15% |
| | | Ii | 3.5 | 3.2 | — | Iron | 7.85 | 211000 | 0.29 | | | |
| | | Iii | 2.25 | 6 | — | Air | — | — | — | | | |
| | | iv | — | 0.5 | 11 | Rubber | 1.05 | 1.9 | 0.49 | | | |
| Example 6 | Circular plate | I | 4.5 | 9.5 | — | Rubber | 1.05 | 1.9 | 0.49 | 526 | 36% | 22% |
| | | Ii | 3.5 | 3.2 | — | Iron | 7.85 | 211000 | 0.29 | | | |
| | | Iii | 2.7 | 6 | — | Air | — | — | — | | | |
| | | iv | — | 0.5 | 11 | Rubber | 1.05 | 1.9 | 0.49 | | | |
| Example 7 | Circular plate | I | 4.5 | 9.5 | — | Rubber | 1.05 | 1.9 | 0.49 | 486 | 44% | 28% |
| | | Ii | 3.5 | 3.2 | — | Iron | 7.85 | 211000 | 0.29 | | | |
| | | Iii | 3 | 6 | — | Air | — | — | — | | | |
| | | iv | — | 0.5 | 11 | Rubber | 1.05 | 1.9 | 0.49 | | | |
| Example 8 | Circular plate | I | 4.5 | 9.5 | — | Rubber | 1.05 | 1.9 | 0.49 | 387 | 64% | 42% |
| | | Ii | 3.5 | 3.2 | — | Iron | 7.85 | 211000 | 0.29 | | | |
| | | Iii | 3.6 | 6 | — | Air | — | — | — | | | |
| | | iv | — | 0.5 | 11 | Rubber | 1.05 | 1.9 | 0.49 | | | |
| Example 9 | Circular plate | I | 4.5 | 9.5 | — | Rubber | 1.05 | 1.9 | 0.49 | 283 | 81% | 58% |
| | | Ii | 3.5 | 3.2 | — | Iron | 7.85 | 211000 | 0.29 | | | |
| | | Iii | 4.05 | 6 | — | Air | — | — | — | | | |
| | | iv | — | 0.5 | 11 | Rubber | 1.05 | 1.9 | 0.49 | | | |
| Comparative Example 5 | Circular plate | I | 4.5 | 9.5 | — | Rubber | 1.05 | 1.9 | 0.49 | 673 | — | — |
| | | Ii | 3.5 | 3.2 | — | Iron | 7.85 | 211000 | 0.29 | | | |
| | | Iii | — | — | — | — | — | — | — | | | |
| | | iv | — | 0.5 | 11 | Rubber | 1.05 | 1.9 | 0.49 | | | |
| Comparative Example 6 | Circular plat | I | 4.5 | 9.5 | — | Rubber | 1.05 | 1.9 | 0.49 | 648 | 6% | 4% |
| | | Ii | 3.5 | 3.2 | — | Iron | 7.85 | 211000 | 0.29 | | | |
| | | Iii | 1.125 | 6 | — | Air | — | — | — | | | |
| | | Iv | — | 0.5 | 11 | Rubber | 1.05 | 1.9 | 0.49 | | | | confirmed that the protrusion portion height was considerably reduced by Moiety iii. When Example 4 and Comparative Example 4 were similarly compared, Example 4 and Comparative Example 4 respectively exhibited protrusion portion heights of 29.5 mm and 44.5 mm, and it was confirmed that the protrusion portion height was considerably reduced by Moiety iii.

<Aspect with Circular Plate as Weight Portion>

Examples 5 to 9

Examples 5 to 9 were each a unit cell including the sound-insulating sheet member illustrated in FIG. 19. The size, the material, and the physical properties of each constituent member of the unit cell were shown in Table 2. The natural frequency of longitudinal expansion/contraction vibration of protrusions in the unit cell was calculated based on the above calculation method, and the results were described in Table 2.

Examples 5 to 9 each exhibited a sufficient area proportion of the space portion, of 25% to 81%, and thus exhibited an amount of the frequency shifted of 15% to 58%, and the Examples were thus confirmed to achieve a reduction in frequency.

On the other hand, Comparative Example 6 exhibited an insufficient area proportion of the space portion, of 6%, and thus exhibited an amount of the frequency shifted of 4%, and the Comparative Example was found to be unable to achieve a reduction in frequency.

<Aspect without Weight Portion>

Examples 10 to 14

Examples 10 to 14 were each a unit cell including the sound-insulating sheet member illustrated in FIG. 20. The size, the material, and the physical properties of each constituent member of the unit cell were shown in Table 3. The natural frequency of longitudinal expansion/contraction vibration of protrusions in the unit cell was calculated based on the above calculation method, and the results were described in Table 3.

Comparative Examples 7 to 8

Comparative Examples 7 to 8 were also each a unit cell including the sound-insulating sheet member illustrated in FIG. 20. The size, the material, and the physical properties of each constituent member of the unit cell were shown in Table 3. The natural frequency of longitudinal expansion/contraction vibration of protrusions in the unit cell was calculated based on the above calculation method, and the results were described in Table 3.

Examples 10 to 14 and Comparative Examples 7 and 8, which were the same in terms of the outer shape of the unit cell, were compared by the difference in r of Moiety iii. Comparative Example 7 was an aspect without Moiety iii (r of Moiety iii: 0).

<Aspect with Circular Plate as Weight Portion, Space Portion being Present in Only Protrusion Portions>

Examples 15 to 19

Examples 15 to 19 were each a unit cell including the sound-insulating sheet member illustrated in FIG. 21. The size, the material, and the physical properties of each constituent member of the unit cell were shown in Table 4. The natural frequency of longitudinal expansion/contraction vibration of protrusions in the unit cell was calculated based on the above calculation method, and the results were described in Table 4.

Comparative Examples 9 to 10

Comparative Examples 9 to 10 were also each a unit cell including the sound-insulating sheet member illustrated in

TABLE 3

| | Weight shape | Moiety | r (mm) | h (mm) | a (mm) | Material | Specific gravity (g/cm³) | Young's Modulus (MPa) | Poisson's ratio | Resonant frequency (Hz) | Area proportion of space portion [%] | Amount of frequency shifted [%] |
|---|---|---|---|---|---|---|---|---|---|---|---|---|
| Example 10 | No weight | I | 4.5 | 9.5 | — | Rubber | 1.05 | 1.9 | 0.49 | 1000 | 25% | 12% |
| | | Ii | — | — | — | — | — | — | — | | | |
| | | Iii | 2.25 | 6 | — | Air | — | — | — | | | |
| | | iv | — | 0.5 | 11 | Rubber | 1.05 | 1.9 | 0.49 | | | |
| Example 11 | No weight | I | 4.5 | 9.5 | — | Rubber | 1.05 | 1.9 | 0.49 | 929 | 36% | 19% |
| | | Ii | — | — | — | — | — | — | — | | | |
| | | Iii | 2.7 | 6 | — | Air | — | — | — | | | |
| | | iv | — | 0.5 | 11 | Rubber | 1.05 | 1.9 | 0.49 | | | |
| Example 12 | No weight | I | 4.5 | 9.5 | — | Rubber | 1.05 | 1.9 | 0.49 | 872 | 44% | 24% |
| | | Ii | — | — | — | — | — | — | — | | | |
| | | Iii | 3 | 6 | — | Air | — | — | — | | | |
| | | iv | — | 0.5 | 11 | Rubber | 1.05 | 1.9 | 0.49 | | | |
| Example 13 | No weight | I | 4.5 | 9.5 | — | Rubber | 1.05 | 1.9 | 0.49 | 721 | 64% | 37% |
| | | Ii | — | — | — | — | — | — | — | | | |
| | | Iii | 3.6 | 6 | — | Air | — | — | — | | | |
| | | iv | — | 0.5 | 11 | Rubber | 1.05 | 1.9 | 0.49 | | | |
| Example 14 | No weight | I | 4.5 | 9.5 | — | Rubber | 1.05 | 1.9 | 0.49 | 548 | 81% | 52% |
| | | Ii | — | — | — | — | — | — | — | | | |
| | | Iii | 4.05 | 6 | — | Air | — | — | — | | | |
| | | iv | — | 0.5 | 11 | Rubber | 1.05 | 1.9 | 0.49 | | | |
| Comparative Example 7 | No weight | I | 4.5 | 9.5 | — | Rubber | 1.05 | 1.9 | 0.49 | 1140 | — | — |
| | | Ii | — | — | — | — | — | — | — | | | |
| | | Iii | — | — | — | — | — | — | — | | | |
| | | iv | — | 0.5 | 11 | Rubber | 1.05 | 1.9 | 0.49 | | | |
| Comparative Example 8 | No weight | I | 4.5 | 9.5 | — | Rubber | 1.05 | 1.9 | 0.49 | 1108 | 6% | 3% |
| | | Ii | — | — | — | — | — | — | — | | | |
| | | Iii | 1.125 | 6 | — | Air | — | — | — | | | |
| | | iv | — | 0.5 | 11 | Rubber | 1.05 | 1.9 | 0.49 | | | |

Examples 10 to 14 each exhibited a sufficient area proportion of the space portion, of 25% to 81%, and thus exhibited an amount of the frequency shifted of 12% to 52%, and the Examples were thus confirmed to achieve a reduction in frequency.

On the other hand, Comparative Example 8 exhibited an insufficient area proportion of the space portion, of 6%, and thus exhibited an amount of the frequency shifted of 3%, and the Comparative Example was found to be unable to achieve a reduction in frequency.

FIG. 21. The size, the material, and the physical properties of each constituent member of the unit cell were shown in Table 4. The natural frequency of longitudinal expansion/contraction vibration of protrusions in the unit cell was calculated based on the above calculation method, and the results were described in Table 4.

Examples 15 to 19 and Comparative Examples 9 to 10, which were the same in terms of the outer shape of the unit cell, were compared by the difference in r of Moiety iii. Comparative Example 9 was an aspect without Moiety iii (r of Moiety iii: 0).

TABLE 4

| | Weight shape | Moiety | r (mm) | h (mm) | a (mm) | Material | Specific gravity (g/cm³) | Young's Modulus (MPa) | Poisson's ratio | Resonant frequency (Hz) | Area proportion of space portion [%] | Amount of frequency shifted [%] |
|---|---|---|---|---|---|---|---|---|---|---|---|---|
| Example 15 | Circular plate | I | 4.5 | 9.5 | — | Rubber | 1.05 | 1.9 | 0.49 | 574 | 25% | 15% |
| | | Ii | 3.5 | 3.2 | — | Iron | 7.85 | 211000 | 0.29 | | | |
| | | Iii | 2.25 | 5.5 | — | Air | — | — | — | | | |
| | | iv | — | 0.5 | 11 | Rubber | 1.05 | 1.9 | 0.49 | | | |
| Example 16 | Circular plate | I | 4.5 | 9.5 | — | Rubber | 1.05 | 1.9 | 0.49 | 527 | 36% | 22% |
| | | Ii | 3.5 | 3.2 | — | Iron | 7.85 | 211000 | 0.29 | | | |
| | | Iii | 2.7 | 5.5 | — | Air | — | — | — | | | |
| | | iv | — | 0.5 | 11 | Rubber | 1.05 | 1.9 | 0.49 | | | |
| Example 17 | Circular plate | I | 4.5 | 9.5 | — | Rubber | 1.05 | 1.9 | 0.49 | 487 | 44% | 28% |
| | | Ii | 3.5 | 3.2 | — | Iron | 7.85 | 211000 | 0.29 | | | |
| | | Iii | 3 | 5.5 | — | Air | — | — | — | | | |
| | | iv | — | 0.5 | 11 | Rubber | 1.05 | 1.9 | 0.49 | | | |
| Example 18 | Circular plate | I | 4.5 | 9.5 | — | Rubber | 1.05 | 1.9 | 0.49 | 388 | 64% | 42% |
| | | Ii | 3.5 | 3.2 | — | Iron | 7.85 | 211000 | 0.29 | | | |
| | | Iii | 3.6 | 5.5 | — | Air | — | — | — | | | |
| | | iv | — | 0.5 | 11 | Rubber | 1.05 | 1.9 | 0.49 | | | |
| Example 19 | Circular plate | I | 4.5 | 9.5 | — | Rubber | 1.05 | 1.9 | 0.49 | 285 | 81% | 58% |
| | | Ii | 3.5 | 3.2 | — | Iron | 7.85 | 211000 | 0.29 | | | |
| | | Iii | 4.05 | 5.5 | — | Air | — | — | — | | | |
| | | iv | — | 0.5 | 11 | Rubber | 1.05 | 1.9 | 0.49 | | | |
| Comparative Example 9 | Circular plate | I | 4.5 | 9.5 | — | Rubber | 1.05 | 1.9 | 0.49 | 673 | — | — |
| | | Ii | 3.5 | 3.2 | — | Iron | 7.85 | 211000 | 0.29 | | | |
| | | Iii | — | — | — | — | — | — | — | | | |
| | | iv | — | 0.5 | 11 | Rubber | 1.05 | 1.9 | 0.49 | | | |
| Comparative Example 10 | Circular plate | I | 4.5 | 9.5 | — | Rubber | 1.05 | 1.9 | 0.49 | 649 | 6% | 4% |
| | | Ii | 3.5 | 3.2 | — | Iron | 7.85 | 211000 | 0.29 | | | |
| | | Iii | 1.125 | 5.5 | — | Air | — | — | — | | | |
| | | iv | — | 0.5 | 11 | Rubber | 1.05 | 1.9 | 0.49 | | | |

Examples 15 to 19 each exhibited a sufficient area proportion of the space portion, of 25% to 81%, and thus exhibited an amount of the frequency shifted of 15% to 58%, and Examples were thus confirmed to achieve a reduction in frequency.

On the other hand, Comparative Example 10 exhibited an insufficient area proportion of the space portion, of 6%, and thus exhibited an amount of the frequency shifted of 4%, and the Comparative Example was found to be unable to achieve a reduction in frequency.

Experiment 2

A nut (material: made of stainless steel) matched in dimension with KE-941-U (manufactured by Shin-Etsu Chemical Co., Ltd.) was used, and each sound-insulating sheet of Examples 1' to 4' and Comparative Examples 1' to 4' was produced in an A6 size by the method (curing temperature: 165° C., heating time: 12 minutes) shown with respect to Production Method 2 described above, according to protrusion portion dimensions shown in Table 1. The Young's modulus of such silicone rubber produced was measured with a dynamic viscoelasticity apparatus DMS6100, and was 7.2 MPa at 25° C. and 10 Hz.

Examples 1' to 4' and Comparative Examples 1' to 4'

[Protrusion Vibration Experiment]
Only one protrusion was cut out from each of the sound-insulating sheets produced, and was bonded to a cylinder seat (dimension: φ30 mm thickness 10 mm, material: A5250) with an adhesive: D434-EL (manufactured by Toagosei Co., Ltd.), to thereby produce a measurement sample.

The measurement sample produced was vibrated with a small vibrator: K2007E01 (manufactured by The Modal Shop, Inc.), and the signals of the force applied to a seat portion and the velocity were analyzed with an FFT analyzer: OR34 (manufactured by OROS).

Vibrating conditions included sweep vibrating of the seat at 100 Hz to 10000 Hz in the sin signal, and the output signals of the above force and the velocity were obtained. Analysis conditions included FFT at a frequency solution of 12.5 Hz, and the force was divided by the velocity to calculate the impedance (dB). The impedance of the measurement sample itself was obtained by subtracting the impedance measured with respect to only the seat from the impedance with respect to the seat and the measurement sample. The measurement results are illustrated in FIGS. 22 to 25, and the frequency imparting the maximum impedance in the measurement sample is illustrated in the drawings.

Figure 22:
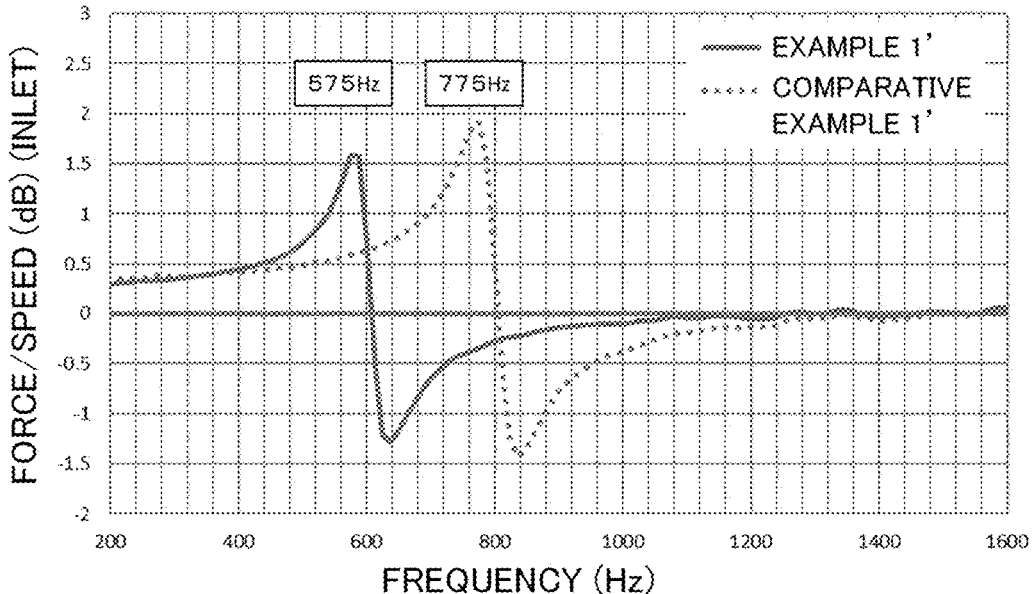
FIG. 22 is a graph illustrating the results of a protrusion vibration experiment in Examples.

FIG. 22 illustrates the measurement results of Example 1' and Comparative Example 1'. These Examples were the same in terms of the outer shape and were compared by the presence or absence of the space portion. Although Example 1' and Comparative Example 1' were the same in terms of the protrusion portion dimensions and respectively exhibited frequencies each imparting the maximum impedance, namely, natural frequencies of 575 Hz and 775 Hz, and it was confirmed that the natural frequency was reduced as in the simulation results.

Figure 23:
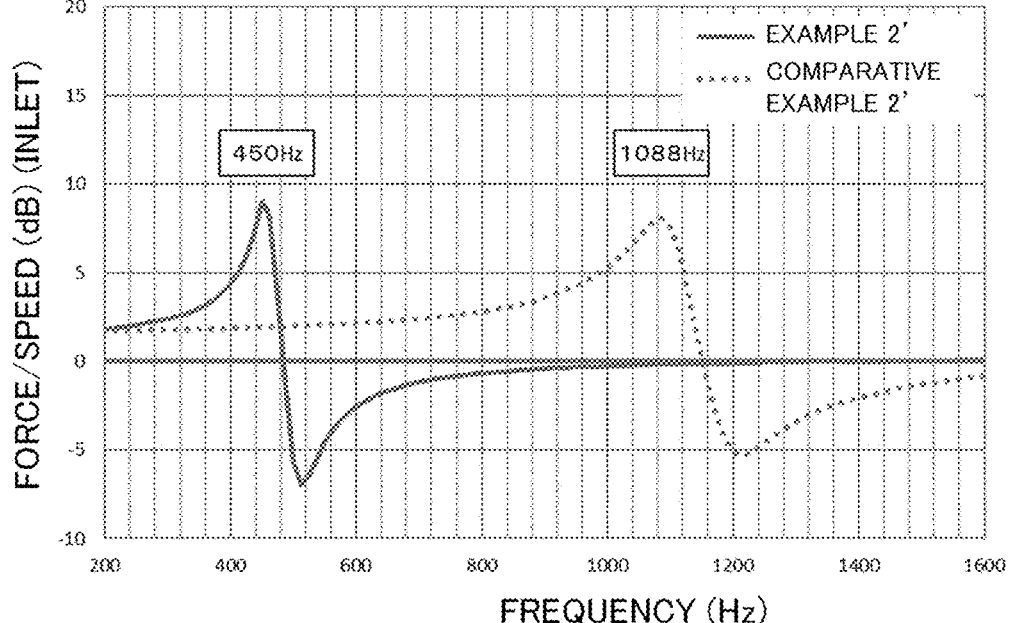
FIG. 23 is a graph illustrating the results of a protrusion vibration experiment in Examples.

FIG. 23 illustrates the measurement results of Example 2' and Comparative Example 2'. These Examples were the same in terms of the outer shape and were compared by the presence or absence of the space portion. Example 2' and Comparative Example 2', although were the same in terms of the protrusion portion dimensions, respectively exhibited frequencies each imparting the maximum impedance, namely, natural frequencies of 450 Hz and 1088 Hz, and it was confirmed that the natural frequency was reduced as in the simulation results.

Figure 24:
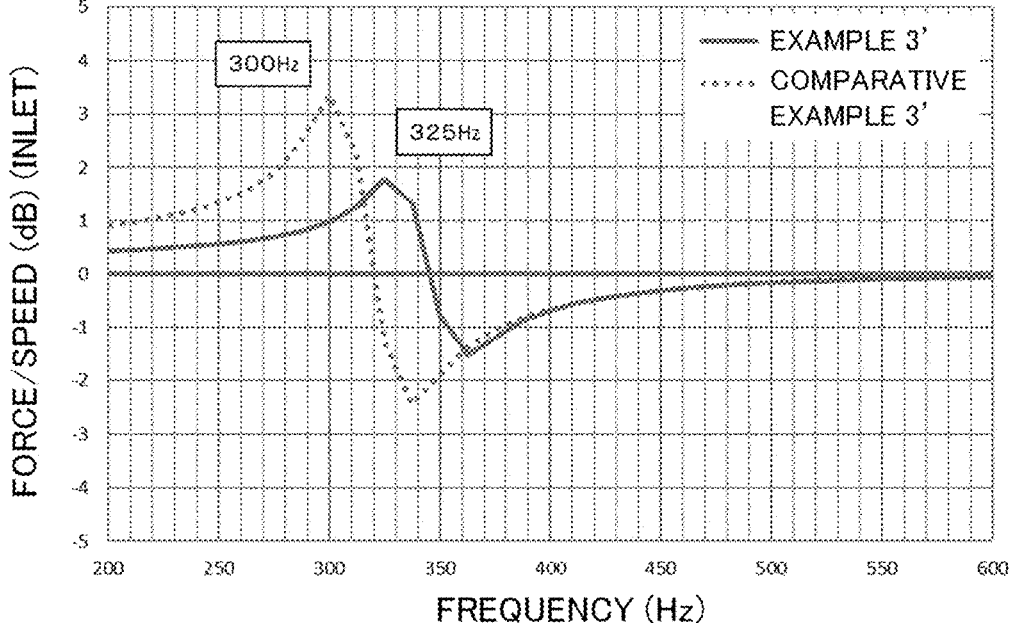
FIG. 24 is a graph illustrating the results of a protrusion vibration experiment in Examples.

FIG. 24 illustrates the measurement results of Example 3' and Comparative Example 3'. These Examples were adjusted about the protrusion portion height so as to be the same in terms of the natural frequency of longitudinal expansion/contraction vibration, and were compared about protrusion portions having the same diameter. Example 3' and Comparative Example 3' respectively exhibited frequencies each imparting the maximum impedance, namely, natural frequencies of 325 Hz and 300 Hz which were almost equal to each other, as in the simulation results. Example 3' and Comparative Example 3' respectively exhibited protrusion portion heights of 15.5 mm and 27.5 mm, and it was confirmed that the protrusion portion height could be considerably reduced by Moiety iii. While Example 3' and Comparative Example 3' were different in peak height, the reason for this difference was because Moiety iii was provided and the protrusion portion height was reduced to result in the difference in mass per protrusion, and these Examples were not significantly different in performance per unit mass.

Figure 25:
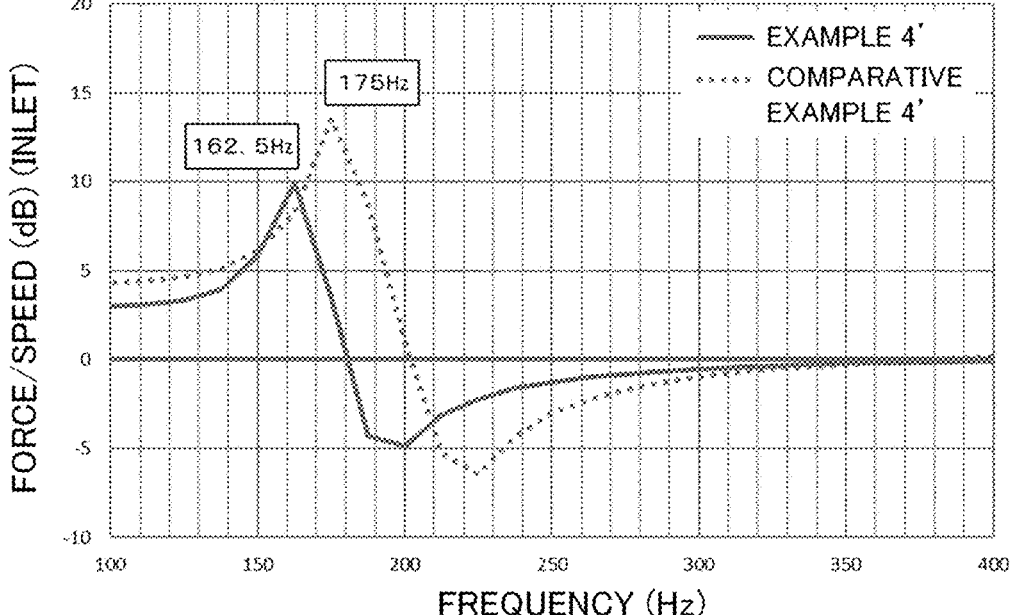
FIG. 25 is a graph illustrating the results of a protrusion vibration experiment in Examples.

FIG. 25 illustrates the measurement results of Example 4' and Comparative Example 4'. These Examples were adjusted about the protrusion portion height so as to be the same in terms of the natural frequency of longitudinal expansion/contraction vibration, and were compared about protrusion portions having the same diameter. Example 4' and Comparative Example 4' respectively exhibited frequencies each imparting the maximum impedance, namely, natural frequencies of 162.5 Hz and 175 Hz which were almost equal to each other, as in the simulation results. Example 4' and Comparative Example 4' respectively exhibited protrusion portion heights of 29.5 mm and 44.5 mm, and it was confirmed that the protrusion portion height could be considerably reduced by Moiety iii. While Example 4' and Comparative Example 4' were also different in peak height, the reason for this difference was because Moiety iii was provided and the protrusion portion height was reduced to result in the difference in mass per protrusion, and these Examples were not significantly different in performance per unit mass.

Figure 26:
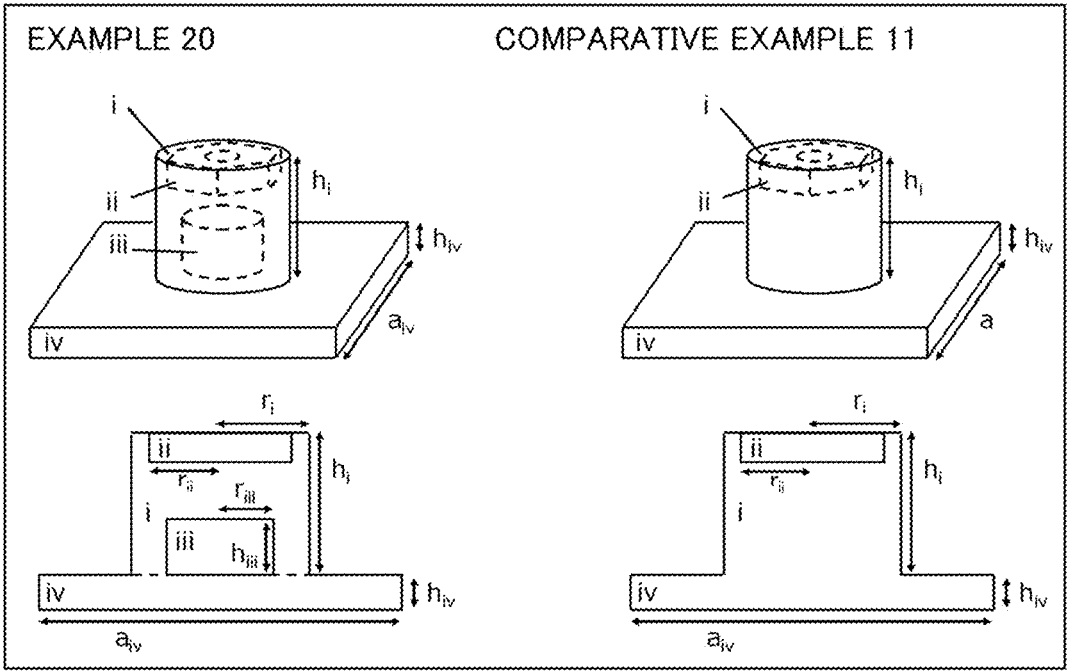
FIG. 26 is a schematic configuration diagram of a unit cell used for the calculation of the amount of sink.

It could be confirmed from the foregoing results that the protrusion portions were reduced in natural frequency and reduced in height also in actual measurement, as in the simulation.

where the sound-insulating sheet member was retained in an environment at 170° C. and then dropped in temperature to 25° C. with, as the initial condition, a condition where the upper faces of the protrusion portions i and ii were completely fixed, was calculated by assigning physical properties (specific gravity, storage modulus (Young's modulus), Poisson's ratio, coefficient of linear expansion) described in Table 5, and material dimensions (r, h, a) described in Table 5 and FIG. 26, with respect to each of Moieties i to iv of the sound-insulating structure body in FIG. 26, in the solid mechanics module equation of COMSOL Multiphysics (COMSOL, Inc.). Specifically, the contraction of dimension occurred due to thermal contraction, and the amount B of sink was evaluated by calculating the maximum value (Hmax) and the minimum value (Hmin) of the height H (the sum of the height of the protrusion portions in a direction perpendicular to the planar direction of the sheet portion and the thickness of the sheet portion) of the composite region in temperature drop to 25° C., and performing calculation with the following expression.

$$\text{Amount } B \text{ of sink}(\mu m) = (\text{Maximum value Hmax}(\mu m) \\ \text{ of height of composite region}) - (\text{Minimum} \\ \text{value Hmin}(\mu m) \text{ of height of composite region})$$

Example 20 and Comparative Example 11

Example 20 and Comparative Example 11 were each a unit cell including the sound-insulating sheet member illustrated in FIG. 26. The size, the material, and the physical properties of each constituent member of the unit cell were shown in Table 5. The amount of sink on a protrusion rear face in the unit cell was calculated based on the above calculation method, and the results were described in Table 5.

Example 20 and Comparative Example 11 were the same in terms of the outer shape of the unit cell, and were compared by the presence or absence of Moiety iii. Example 20 and Comparative Example 11 respectively exhibited amounts of sink on protrusion rear faces, of 29 μm and 391 μm, and it was confirmed that the amount of sink was considerably reduced by Moiety iii.

TABLE 5

| | Weight shape | Moiety | r (mm) | h (mm) | a (mm) | Material | Specific gravity (g/cm³) | Young's Modulus (MPa) | Poisson's ratio | Coefficient of linear expansion (1/K) | Sink on protrusion bottom face (μm) |
|---|---|---|---|---|---|---|---|---|---|---|---|
| Example 20 | Hexagonal plate | I | 4.5 | 4.5 | — | Rubber | 1.05 | 1.9 | 0.49 | 3.00E−04 | 29 |
| | | Ii | 3.5 | 3.2 | — | Iron | 7.85 | 211000 | 0.29 | 1.70E−05 | |
| | | Iii | 3 | 0.5 | — | Air | — | — | — | — | |
| | | iv | — | 0.5 | 11 | Rubber | 1.05 | 1.9 | 0.49 | 3.00E−04 | |
| Comparative Example 11 | Hexagonal plate | I | 4.5 | 4.5 | — | Rubber | 1.05 | 1.9 | 0.49 | 3.00E−04 | 391 |
| | | Ii | 2 | 3.2 | 7 | Iron | 7.85 | 211000 | 0.29 | 1.70E−05 | |
| | | Iii | — | — | — | — | — | — | — | — | |
| | | iv | — | 0.5 | 11 | Rubber | 1.05 | 1.9 | 0.49 | 3.00E−04 | |

[Calculation of Sink on Rear Face of Protrusion]

The amount of sink on a rear face of a protrusion structure was calculated with the COMSOL Multiphysics (COMSOL, Inc.) in Examples described below. Conditions of the physical simulation will be described in detail.

The amount of sink on a protrusion rear face in Examples described below was calculated according to the following procedure. The change in structure dimension, in the case

Experiment 3

<Examination of Trampoline Vibration>

Examples A-1 to A-16 were each a unit cell including the sound-insulating sheet member illustrated in FIG. 18. The size, the material, and the physical properties of each constituent member of the unit cell were shown in Table 6 and Table 7. Table 7 shows the size, the material, and the physical properties of each constituent member common in Examples A-1 to A-16. The natural frequency (resonant frequency) of longitudinal expansion/contraction vibration or trampoline vibration of protrusions in the unit cell, and the ratio $d_P/d_Q$ between the displacement field Z component $d_P$ of the outer periphery P of the tip of the protrusion portions 21 and the displacement field Z component $d_Q$ of the central portion Q of the tip of the protrusion portions 21 were calculated with the COMSOL Multiphysics (COMSOL, Inc.), and the results were described in Table 6. Conditions of the physical simulation will be described in detail.

A finite element method was used in the physical simulation, as in Experiment 1. The natural vibration mode was calculated in a condition where the bottom face of a sheet portion iv was completely fixed, by assigning physical properties (specific gravity, storage modulus (Young's modulus), Poisson's ratio) described in Table 7, and material dimensions (r, h, a) described in Table 6, Table 7, and FIG. 18, with respect to each of Moieties i to iv of the sound-insulating structure body in FIG. 18, in the solid mechanics module equation of COMSOL Multiphysics (COMSOL, Inc.). FIG. 18 illustrates an aspect with a perforated nut (hexagonal plate) as a weight portion. This calculation is conducted with assuming a case of no influence by any adhesive, as an ideal state, and thus is to calculate the natural frequency under a condition where the bottom face of Moiety iv is completely fixed.

In Table 6, the "Displacement field Z component ratio $d_P/d_Q$" represents the ratio between the displacement field Z component $d_P$ of the outer periphery P of the tip of the protrusion portions 21 and the displacement field Z component $d_Q$ of the central portion Q of the tip of the protrusion portions 21. It is indicated that, as the value of $d_P/d_Q$ is closer to 1, the outer periphery P of the tip of the protrusion portions 21 and the central portion Q of the tip of the protrusion portions 21 are equally vibrated, namely, the feature of longitudinal expansion/contraction vibration mode is strong. It is indicated that, as the value of $d_P/d_Q$ is closer to 0, the central portion Q of the tip of the protrusion portions 21 is largely moved relative to the outer periphery P of the tip of the protrusion portions 21, namely, the feature trampoline vibration mode is strong.

TABLE 6

| Example | Weight shape | Protrusion portion radius $r_i$ [mm] | Protrusion portion height $h_i$ [mm] | Space portion radius $r_{iii}$ [mm] | Space portion height $h_{iii}$ [mm] | Area proportion of space portion [%] | Sheet portion length $a_{iv}$ [mm] |
|---|---|---|---|---|---|---|---|
| A-1 | Hexagonal | 4.5 | 4.5 | 3.6 | 1.3 | 64 | 11 |
| A-2 | plate | 6.25 | 4.5 | 5 | 1.3 | 64 | 14.5 |
| A-3 | | 8.75 | 4.5 | 7 | 1.3 | 64 | 19.5 |
| A-4 | | 10 | 4.5 | 8 | 1.3 | 64 | 22 |
| A-5 | | 15 | 4.5 | 12 | 1.3 | 64 | 32 |
| A-6 | | 25 | 4.5 | 20 | 1.3 | 64 | 52 |
| A-7 | | 35 | 4.5 | 28 | 1.3 | 64 | 72 |
| A-8 | | 45 | 4.5 | 36 | 1.3 | 64 | 92 |
| A-9 | | 4.5 | 6 | 3.6 | 2.8 | 64 | 11 |
| A-10 | Hexagonal | 4.5 | 29.5 | 3.6 | 26.3 | 64 | 11 |
| A-11 | plate | 6.25 | 29.5 | 5 | 26.3 | 64 | 14.5 |
| A-12 | | 15 | 29.5 | 12 | 26.3 | 64 | 32 |
| A-13 | | 25 | 29.5 | 20 | 26.3 | 64 | 52 |
| A-14 | | 35 | 29.5 | 28 | 26.3 | 64 | 72 |
| A-15 | | 45 | 29.5 | 36 | 26.3 | 64 | 92 |
| A-16 | | 25 | 14.5 | 20 | 11.3 | 64 | 52 |

| Example | Sheet portion length $a_{iv}$ [mm] | Displacement field Z component ratio $d_P/d_Q$ | Composite region height $H = h_i + h_{iv}$ [mm] | Protrusion portion equivalent diameter/protrusion portion equivalent diameter $D_P/D_W$ | Composite region height/protrusion portion equivalent diameter $H/D_P$ | Vibration mode | Natural frequency | Amount of Frequency shifted |
|---|---|---|---|---|---|---|---|---|
| A-1 | 11 | 1.00 | 5 | 1.11 | 0.56 | Longitudinal expansion/contraction | 1033 | 53 |
| A-2 | 14.5 | 0.37 | 5 | 1.54 | 0.40 | Trampoline | 857 | 65 |
| A-3 | 19.5 | 0.04 | 5 | 2.16 | 0.29 | Trampoline | 697 | 70 |
| A-4 | 22 | 0.08 | 5 | 2.47 | 0.25 | Trampoline | 643 | 70 |
| A-5 | 32 | 0.04 | 5 | 3.70 | 0.17 | Trampoline | 519 | 69 |
| A-6 | 52 | 0.02 | 5 | 6.17 | 0.10 | Trampoline | 362 | 74 |
| A-7 | 72 | 0.01 | 5 | 8.64 | 0.07 | Trampoline | 240 | 82 |
| A-8 | 92 | 0.00 | 5 | 11.11 | 0.06 | Trampoline | 164 | 87 |
| A-9 | 11 | 0.99 | 6.5 | 1.11 | 0.72 | Longitudinal expansion/contraction | 699 | 46 |
| A-10 | 11 | 1.00 | 30 | 1.11 | 3.33 | Longitudinal expansion/contraction | 196 | 31 |
| A-11 | 14.5 | 0.94 | 30 | 1.54 | 2.40 | Longitudinal expansion/contraction | 227 | 29 |

TABLE 6-continued

| A-12 | 32 | 0.21 | 30 | 3.70 | 1.00 | Trampoline | 216 | 40 |
| A-13 | 52 | 0.00 | 30 | 6.17 | 0.60 | Trampoline | 154 | 58 |
| A-14 | 72 | 0.00 | 30 | 8.64 | 0.43 | Trampoline | 133 | 63 |
| A-15 | 92 | 0.00 | 30 | 11.11 | 0.33 | Trampoline | 119 | 65 |
| A-16 | 52 | 0.03 | 15 | 6.17 | 0.30 | Trampoline | 219 | 66 |

TABLE 7

| Moiety | Material | Specific gravity (g/cm³) | Young's modulus (MPa) | Poisson's ratio | r (mm) | h (mm) | a (mm) |
|---|---|---|---|---|---|---|---|
| i, protrusion portion | Rubber | 1.05 | 1.9 | 0.49 | ✕ | ✕ | — |
| ii, weight portion | Iron | 7.85 | 211000 | 0.29 | 2 | 3.2 | 7 |
| iii, space portion | Air | — | — | — | ✕ | ✕ | — |
| iv, sheet portion | Rubber | 1.05 | 1.9 | 0.49 | — | 0.5 | ✕ |

✕ Described in Table 6

Examples A-1 to A-8 were compared, which were the same in terms of the protrusion portion height and the space portion area proportion of the unit cells, but different in protrusion portion radius. Example A-1 representing a longitudinal expansion/contraction vibration mode exhibited a resonant frequency of 1033 Hz, and Examples A-2 to A-8 each representing a trampoline vibration mode were confirmed to be reduced in natural frequency according to an increase in protrusion portion radius. When Examples A-10 to A-11 and Examples A-12 to A-15 were similarly compared, it was confirmed that, according to an increase in protrusion portion radius, Examples A-10 to A-11 each representing a longitudinal expansion/contraction vibration mode was increased in resonant frequency, whereas Examples A-12 to A-15 each representing a trampoline vibration mode was reduced in resonant frequency. It was confirmed by comparison at the same protrusion portion height that a trampoline vibration mode was larger in resonant frequency shift proportion and more suitable for a reduction in frequency, than a longitudinal expansion/contraction vibration mode.

Respective comparisons between Example A-3 and Example A-9, and between Example A-11 and Example A-16 were comparisons in which the protrusion portion height and the protrusion portion radius were adjusted so that the natural frequencies of longitudinal expansion/contraction vibration and trampoline vibration were almost equal to each other. Example A-9 representing a longitudinal expansion/contraction vibration mode and Example A-3 representing a trampoline vibration mode, although were almost equal to each other in natural frequency, respectively exhibited protrusion portion heights of 6 mm and 4.5 mm, and it was confirmed that a trampoline vibration mode was lower in protrusion portion height for the occurrence of resonance at a specified resonant frequency. When Example A-11 and Example A-16 were similarly compared, Example A-11 representing a longitudinal expansion/contraction vibration mode and Example A-16 representing a trampoline vibration mode respectively exhibited protrusion portion heights of 29.5 mm and 14.5 mm, and it was confirmed that a trampoline vibration mode was considerably lower in protrusion portion height for the occurrence of resonance at a specified resonant frequency. It has been confirmed from the foregoing that a trampoline vibration mode can be used in design of a protrusion portion shape of the same frequency to result in a reduction in protrusion portion height, as compared with a longitudinal expansion/contraction vibration mode.

REFERENCE SIGNS LIST

11: sheet portion
11a: sheet face
11b: sheet face
12: space portion
21: protrusion portion
22: protrusion-formed portion
23: weight portion
23': weight
24: acoustic absorbent
51: support
61a: lower mold
61b: upper mold
62: cavity
100: sound-insulating sheet member
101: sound-insulating sheet member
200: sound-insulating structure body
201: sound-insulating structure body
S: spring portion
Q: quadrangular portion

What is claimed is:

1. A sound-insulating sheet member comprising:
A sheet portion having rubber elasticity; and
A plurality of protrusion portions that is provided on at least one face of the sheet portion and that has rubber elasticity,
Wherein a region of the sheet portion, where the protrusion portion are provided, contains a space portion,
The space portion of the sheet portion extends to the protrusion portions such that the protrusion portion contains the space portion, and
The space portion of the sheet portion penetrates through a face of the sheet portion, the face being opposite to a face where the protrusion portions are provided.

2. The sound-insulating sheet member according to claim 1 wherein the protrusion portions do no contain a though-hole connecting the space portion and an external.

3. The sound-insulating sheet member according to claim 1 wherein, in a cross section where an area proportion occupied by the space portion is maximum in a cross section of the protrusion portions in a planar direction of the sheet portion, the proportion is 90% or less.

4. The sound-insulating sheet member according to claim 1 wherein, in a cross section where an area proportion occupied by the space portion is maximum in a cross section of the protrusion portions in a planar direction of the sheet portion, the proportion is 20% or more.

5. The sound-insulating sheet member according to claim 1 wherein a volume proportion occupied by the space portion in the protrusion portion is 10% or more.

6. The sound-insulating sheet member according to claim 1 wherein one part of the space portion of the protrusion portions is provided so as to reach at least any face of a tip face and a side face of the protrusion portions.

7. The sound-insulating sheet member according to claim 1, wherein the protrusion portions contain a weight portion at a tip.

8. The sound-insulating sheet member according to claim 7, wherein a ratio (DP/DW) of an equivalent diameter DP of the protrusion portions, represented by the following expression, to an equivalent diameter DW of the weight portion, represented by the following expression, is 1.25 or more:

$$DP=4AP/pP$$

$$DW=4AW/pW$$

DP: the equivalent diameter of the protrusion portions
DW: the equivalent diameter of the weight portion
AP: an area of a region formed from an outer perimeter of a cross section of the protrusion portions in the planar direction of the sheet portion
AW: an area of a region formed from an outer perimeter of a cross section of the weight portion in the planar direction of the sheet portion
pP: a length of an outer perimeter of a cross section of the protrusion portions in the planar direction of the sheet portion
pW: a length of an outer perimeter of a cross section of the weight portion in the planar direction of the sheet portion.

9. The sound-insulating sheet member according to claim 7, wherein a ratio (H/DP) of a total value H of a height of the protrusion portions and a thickness of the sheet portion, to DP represented by the following expression, is 2.1 or less:

$$DP=4AP/pP$$

DP: the equivalent diameter of the protrusion portions
AP: an area of a region formed from an outer perimeter of a cross section of the protrusion portions in the planar direction of the sheet portion
pP: a length of an outer perimeter of a cross section of the protrusion portions in the planar direction of the sheet portion.

10. The sound-insulating sheet member according to claim 7, wherein at least a part of the weight portion is embedded in the protrusion portions.

11. The sound-insulating sheet member according to claim 1, wherein the sound-insulating sheet member is an integrated molded article.

12. A sound-insulating structure body comprising at least the sound-insulating sheet member according to claim 1, and a support supporting the sound-insulating sheet member.

13. The sound-insulating structure body according to claim 12, wherein the sheet portion and the protrusion portions independently comprise at least one selected from the group consisting of a thermosetting elastomer, a photo-curable elastomer, and a thermoplastic elastomer.

14. The sound-insulating sheet member according to claim 1,
wherein only the sheet portion contains the space portion, and
the space portion of the sheet portion penetrates through a face of the sheet portion, the face being opposite to a face where the protrusion portions are provided.

15. The sound-insulating sheet member according to claim 1,
wherein the space portion of the sheet portion extends to the protrusion portions such that the protrusion portion contains the space portion,
the space portion of the sheet portion penetrates through a face of the sheet portion, the face being opposite to a face where the protrusion portions are provided, and
a cross section width of the space portion of the sheet portion is the same as a cross section width of the space portion of the protrusion portion.

16. The sound-insulating sheet member according to claim 1,
wherein the space portion of the sheet portion extends to the protrusion portions such that the protrusion portion contains the space portion,
the space portion of the sheet portion penetrates through a face of the sheet portion, the face being opposite to a face where the protrusion portions are provided, and
a cross section width of the space portion of the sheet portion is smaller than a cross section width of the space portion of the protrusion portion.

* * * * *